United States Patent
Kamei

(10) Patent No.: US 8,394,220 B2
(45) Date of Patent: Mar. 12, 2013

(54) METHOD FOR MANUFACTURING HONEYCOMB STRUCTURE

(75) Inventor: Yoshiyuki Kamei, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 8 days.

(21) Appl. No.: 13/073,036

(22) Filed: Mar. 28, 2011

(65) Prior Publication Data

US 2011/0240205 A1 Oct. 6, 2011

(30) Foreign Application Priority Data

Mar. 31, 2010 (JP) .................. 2010-080350

(51) Int. Cl.
- C03B 29/00 (2006.01)
- B29C 65/00 (2006.01)
- C04B 33/34 (2006.01)

(52) U.S. Cl. .................. 156/89.11; 156/60; 156/89.12; 156/89.22

(58) Field of Classification Search ............... 156/89.11, 156/89.22

See application file for complete search history.

(56) References Cited

U.S. PATENT DOCUMENTS

| | | | |
|---|---|---|---|
| 7,413,625 B2 * | 8/2008 | Fujita et al. ................. | 156/312 |
| 7,556,703 B2 * | 7/2009 | Fujita et al. ................. | 156/89.22 |
| 2005/0076626 A1 * | 4/2005 | Kudo et al. ................. | 55/523 |
| 2005/0109023 A1 | 5/2005 | Kudo et al. | |
| 2005/0166729 A1 | 8/2005 | Nishio et al. | |
| 2008/0237941 A1 * | 10/2008 | Ohno et al. .................. | 264/630 |
| 2008/0241015 A1 | 10/2008 | Kudo et al. | |
| 2009/0070982 A1 * | 3/2009 | Nishio et al. .................. | 29/428 |

FOREIGN PATENT DOCUMENTS

| | | |
|---|---|---|
| JP | 2000-007455 | 1/2000 |
| JP | 2002-255654 A1 | 9/2002 |
| JP | 2003-291054 | 10/2003 |
| JP | 2009-050849 | 3/2009 |

OTHER PUBLICATIONS

Japanese Office Action dated Apr. 24, 2012.

* cited by examiner

*Primary Examiner* — Philip Tucker
*Assistant Examiner* — Alex Efta
(74) *Attorney, Agent, or Firm* — Burr & Brown

(57) ABSTRACT

A method for manufacturing a honeycomb structure includes the steps of: producing triangular segments as cut quadrangular prism honeycomb fired bodies in double by cutting half, forming a pseudo quadrangular segment by fitting a hollow auxiliary member whose outer peripheral shape is triangular on a cut triangular segment, disposing the honeycomb fired bodies and the pseudo quadrangular segments to form an assembly, bonding the assembly by applying a bonding material, and then applying pressure to thus bonded assembly to obtain a honeycomb block body with the hallow auxiliary members, drying the applied bonding material and then detaching the hollow auxiliary members to obtain a honeycomb block body, and grinding an outer peripheral portion of a resultant honeycomb block body to obtain a honeycomb structure.

6 Claims, 9 Drawing Sheets

METHOD FOR MANUFACTURING HONEYCOMB STRUCTURE

FIELD OF THE INVENTION

The present invention relates to a method for manufacturing a honeycomb structure. More specifically, the present invention relates to a method for manufacturing a honeycomb structure, the method being capable of improving the raw material yield and reducing the manufacturing costs.

DESCRIPTION OF RELATED ART

In various fields of automobiles, chemistry, electric power, iron and steel, etc., there is employed a ceramic honeycomb structure excellent in thermal resistance and corrosion resistance as a carrier for a catalyst apparatus or a filter used for environmental countermeasure, collection of specific substrates, or the like. In particular, recently, a honeycomb structure is subjected to alternate plugging of the cell opening portions on both the end faces to obtain a plugged honeycomb structure, and it is used actively as a diesel particulate filter (DPF) for trapping particulate matter (PM) discharged from diesel engines and the like. As a material for a honeycomb structure used at high temperature under a corrosive gas atmosphere, there is suitably used silicon carbide (SiC), cordierite, aluminum titanate (AT), or the like, excellent in thermal resistance and chemical stability.

Since silicon carbide has a relatively large rate of thermal expansion among these materials, a large-volume honeycomb structure formed of silicon carbide as the aggregate may cause a defect due to a thermal shock when it is used. In addition, a defect may be caused due to a thermal shock upon combustion removing the trapped particulate matter. Further, in the case of manufacturing the large-volume honeycomb structure, since a crack may be generated due to the internal-external temperature difference upon firing, there rises a problem that degreasing and firing have to be performed slowly by spending many times the normal time. Therefore, regarding a honeycomb structure formed of silicon carbide as the aggregate, in the case of manufacturing a honeycomb structure having at least a predetermined size, generally, a plurality of small quadrangular prism plugged honeycomb segments (honeycomb structures) are formed and bonded them together to obtain a large bonded body, followed by subjecting the outer periphery to rough processing and grinding to obtain a plugged honeycomb structure having a desired shape such as a circular cylindrical shape (see Patent Document 1). In addition, there is disclosed a bonded article where triangular prism honeycomb segments are disposed in the portions (corner portions) corresponding with the "corners" in a cross section perpendicular to the central axis of the bonded article in the case of manufacturing a large quadrangular prism bonded article by bonding quadrangular prism honeycomb segments together (see Patent Documents 2 and 3).

PRIOR ART DOCUMENTS

Patent Documents

[Patent Document 1] JP-A-2003-291054
[Patent Document 2] JP-A-2000-7455
[Patent Document 3] JP-A-2009-50849

SUMMARY OF THE INVENTION

In the case of manufacturing a honeycomb structure having a desired shape by the method described in Patent Document 1, after producing a large quadrangular prism bonded body (honeycomb block body) by bonding a plurality of quadrangular prism honeycomb segments together, it is generally necessary to grind the outer periphery in order to form an almost desired shape to obtain a honeycomb structure having a desired shape. Incidentally, in the present specification, grinding the outer periphery of the honeycomb block body means the entire process of manufacturing a honeycomb structure having a desired shape by grinding the outer periphery of the honeycomb block body, and includes rough processing, processing to finish with high accuracy, etc., of the honeycomb block body. Here, as such honeycomb structures, there are manufactured a large number of honeycomb structures each having a prism shape with circular or an elliptic shape of a cross section perpendicular to the central axis. In this case, since the outer periphery of the quadrangular prism bonded body is subjected to rough processing and grinding to obtain the cross section having a circular shape or the like, it is necessary to remove almost all the honeycomb segments disposed in the positions (corner portions) of "corners" in a cross section perpendicular to the central axis of the quadrangular prism bonded body by grinding. Therefore, there is a problem of low raw material yield.

Moreover, in the case that a bonded body where triangular prism honeycomb segments are disposed in the positions corresponding with the "corners" in a cross section perpendicular to the central axis of the bonded body as described in Patent Documents 2 and 3 is manufactured, when a bonded body is manufactured by bonding the honeycomb segments together, it is necessary to apply pressure from the outer periphery side toward the inside of the bonded body to bond the honeycomb segments together under pressure. However, it is not easy to apply pressure to the portions of the triangular prism honeycomb segments, and there is a problem of difficulty in sufficiently bonding the honeycomb segments together. In addition, it is not easy to dispose the triangular segments on the side face sides upon piling up the segments.

The present invention has been made in view of the aforementioned problems and aims to provide a method for manufacturing a honeycomb structure, the method being capable of improving the raw material yield and reducing the manufacturing costs.

In order to solve the aforementioned problems, the present invention provides the following method for manufacturing a honeycomb structure.

[1] A method for manufacturing a honeycomb structure, the method comprising the steps of: forming a plurality of quadrangular prism honeycomb formed bodies each having partition walls defining a plurality of cells functioning as fluid passages and extending from one end face to another end face, and a rectangular cross section perpendicular to a central axis by subjecting a forming raw material, firing thus formed plurality of honeycomb formed bodies to obtain a plurality of quadrangular prism honeycomb fired bodies, producing triangular prism segments by cutting in half at least one of the plurality of the quadrangular prism honeycomb fired bodies along a diagonal in a cross section perpendicular to a central axis so as to be parallel to the central axis each other, forming a quadrangular prism pseudo segment by fitting an aluminum or aluminum alloy hollow auxiliary member whose outer peripheral shape has a cross section perpendicular to a central axis that is the same shape as an outer peripheral shape of a cross section perpendicular to the central axis of each of the triangular prism segments so that a hypotenuse of the cross section perpendicular to the central axis of the hollow auxiliary member faces a hypotenuse of the cross section perpendicular to the central axis of the triangular prism segment, forming a predetermined number of the quadrangular prism honeycomb fired bodies and a predetermined number of thus formed quadrangular prism pseudo segments into an assembly of honeycomb segments in such a manner that two faces of each hollow auxiliary member, which form a right angle there between in a cross section perpendicular to the central axis of the assembly, are located at an outermost peripheral position at respective corners of the assembly, and the two faces which constitute the respective remaining other two faces of the quadrangular prism pseudo segments of all the triangular prism segments constituting the quadrangular prism pseudo segments together with the hollow auxiliary members are brought into contact with two faces of the quadrangular prism honeycomb fired bodies adjacent to each of the quadrangular prism pseudo segments in a cross section perpendicular to the central axis, bonding the assembly by applying a bonding material to spaces formed between the disposed segments, and then applying pressure to the bonded assembly by clenching the bonded assembly from the outermost periphery toward the inside to obtain a honeycomb block body having the hollow auxiliary members at the respective corners, drying the applied bonding material applied to the spaces of the honeycomb block body having the hollow auxiliary members and then detaching all of the hollow auxiliary members from a dried honeycomb block body to obtain a honeycomb block body, and grinding an outer peripheral portion of a resultant honeycomb block body in such a manner that at least apart of each of all of the triangular prism segments is ground to obtain a honeycomb structure having a predetermined shape.

[2] A method for manufacturing a honeycomb structure according to [1], wherein each hollow auxiliary member is fitted on each triangular prism segment with a resin adhesive material, individually.

[3] A method for manufacturing a honeycomb structure according to [1] or [2], wherein four sets of triangular prism segments are produced by cutting, and the assembly is produced as a honeycomb block body having a whole shape by disposing each of the triangular prism segments at each of four vertex portions of a rectangle in a cross section perpendicular to the central axis.

[4] A method for manufacturing a honeycomb structure according to [1] or [2], wherein eight triangular prism segments are produced by cutting, and the assembly is produced as a honeycomb block body having a whole shape by disposing each of the triangular prism segments at eight portions each of which is formed as a vacant corner which is defined by two adjacent quadrangular prism honeycomb fired bodies of the assembly, respectively, in a cross section perpendicular to the central axis.

According to a method for manufacturing a honeycomb structure of the present invention, a honeycomb structure is obtained by forming a quadrangular prism pseudo segment by fitting an aluminum or aluminum alloy hollow auxiliary member whose outer peripheral shape of a cross section perpendicular to a central axis is the same shape as an outer peripheral shape of a cross section perpendicular to the central axis of each of the triangular prism segments on a triangular prism segment so that a hypotenuse of a cross section perpendicular to the central axis of the hollow auxiliary member faces a hypotenuse of a cross section perpendicular to the central axis of the triangular prism segment, forming the quadrangular prism honeycomb fired bodies and the formed quadrangular prism pseudo segments into an assembly of honeycomb segments in such a manner that two faces of each hollow auxiliary member, which form a right angle there between in a cross section perpendicular to the central axis of the assembly, are located at an outermost peripheral position at respective corners of the assembly, and the two faces which constitute the respective remaining other two faces of the pseudo quadrangular segments of all of the triangular prism segments constituting the pseudo quadrangular segments together with the hollow auxiliary members are brought into contact with two faces of the quadrangular prism honeycomb fired bodies adjacent to each of the quadrangular prism pseudo segments in a cross section perpendicular to the central axis, bonding the assembly by applying a bonding material to spaces formed between the segments in the assembly, and then applying pressure to the bonded assembly by clenching the bonded assembly from the outermost periphery toward the inside to obtain a honeycomb block body having the hollow auxiliary members at respective corners, drying the applied bonding material applied to the spaces of the honeycomb block body having the hollow auxiliary members and then detaching all of the hollow auxiliary members from a dried honeycomb block body to obtain a honeycomb block body, and grinding an outer peripheral portion of a resultant honeycomb block body in such a manner that at least a part of each of all of the triangular prism segments is ground to obtain a honeycomb structure having a predetermined shape. So, the portion removed by grinding upon grinding the outer peripheral portion can be reduced, and therefore the raw material yield can be improved.

Further, after drying the bonding material of the honeycomb block body having the hollow auxiliary members, the auxiliary members are detached from the honeycomb block body. So, slippage of the bonding of the quadrangular prism honeycomb fired bodies and the triangular prism segments upon detaching the auxiliary members can be prevented. Moreover, since auxiliary members have a hollow shape and are made of aluminum or aluminum alloy, the auxiliary members are light and have high strength, and therefore the auxiliary members can easily be fitted on the triangular prism segments. In addition, since the auxiliary members have a hollow shape and are made of aluminum or aluminum alloy, the thermal capacity of the auxiliary members can be made small, and the thermal conductivity thereof can be made relatively high. Therefore, the rising rate of temperature upon drying the bonded material of the honeycomb block body having been provided with the auxiliary members can be increased.

DETAILED DESCRIPTION OF THE INVENTION

Next, embodiments for carrying out the present invention will be described in detail with referring to drawings. However, the present invention is not limited to the following embodiments, and it should be understood that alternations, improvements, and the like of the design may appropriately be made of the following embodiments without departing from the scope of the present invention based on the ordinary knowledge of a person of ordinary skill.

Figure 1:
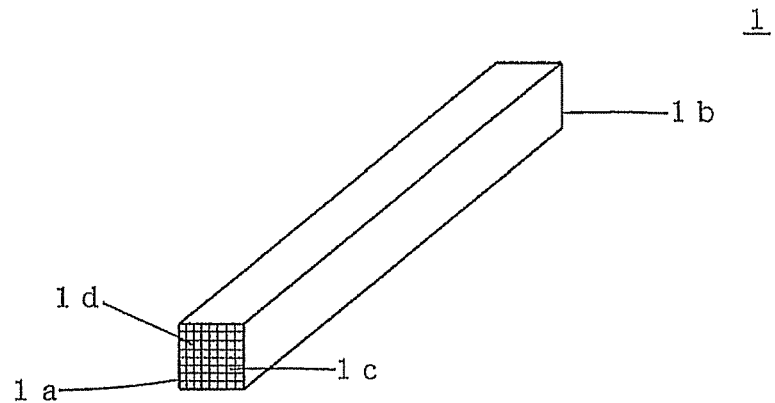
FIG. 1 is a perspective view schematically showing a quadrangular prism honeycomb formed body formed in a process for manufacturing a honeycomb structure in one embodiment of a method for manufacturing a honeycomb structure of the present invention.
Figure 2:
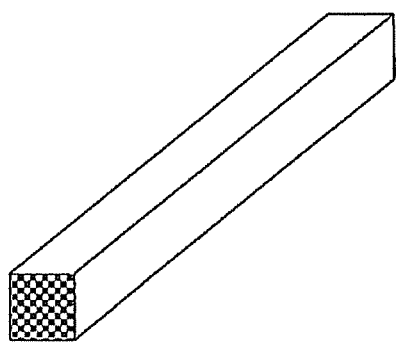
FIG. 2 is a perspective view schematically showing a quadrangular prism honeycomb fired body formed in a process for manufacturing a honeycomb structure in one embodiment of a method for manufacturing a honeycomb structure of the present invention.

In one embodiment of the method for manufacturing a honeycomb structure of the present invention, as shown in FIGS. 1 to 10, a honeycomb structure 100 is obtained by forming a plurality of quadrangular prism honeycomb formed bodies 1 each having partition walls 1d defining a plurality of cells 1c functioning as fluid passages and extending from one end face 1a to another end face 1b, and a rectangular cross section perpendicular to the central axis by subjecting a forming raw material, firing thus formed plurality of honeycomb formed bodies 1 to obtain a plurality of quadrangular prism honeycomb fired bodies 2, producing triangular prism triangular segments 3, by cutting in half at least one of the plurality of the quadrangular prism honeycomb fired bodies 2 along a diagonal in a cross section perpendicular to a central axis so as to be parallel to the central axis each other, forming a quadrangular prism pseudo segment 5 by fitting an aluminum or aluminum alloy hollow auxiliary member 4 whose outer peripheral shape has a cross section perpendicular to a central axis that is the same shape as an outer peripheral shape of a cross section perpendicular to the central axis of each of the triangular prism segments 3 so that a hypotenuse of a cross section perpendicular to the central axis of the hollow auxiliary member 4 faces a hypotenuse of a cross section perpendicular to the central axis of the triangular prism segment, forming a predetermined number of the quadrangular prism honeycomb fired bodies 2 and a predetermined number of the formed quadrangular prism pseudo segments 5 into an assembly of honeycomb segments in such a manner that two faces of each hollow auxiliary member, which form a right angle there between in a cross section perpendicular to the central axis of the assembly, are located at an outermost peripheral position at respective corners of the assembly, and the two faces which constitute the respective remaining other two faces of the quadrangular prism pseudo segments 5 of all of the triangular prism segments 3 constituting the quadrangular prism pseudo segments 5 together with the hollow auxiliary members 4 are brought into contact with two faces of the quadrangular prism honeycomb fired bodies 2 adjacent to each of the quadrangular prism pseudo segments 5 in a cross section perpendicular to the central axis, bonding the assembly by applying a bonding material 13 to spaces formed between the segments in the assembly, and then applying pressure to thus bonded assembly by clenching the bonded assembly from the outermost periphery toward the inside to obtain a honeycomb block body 11 having the hollow auxiliary members at respective corners, drying the applied bonding material 13 applied to the spaces of the honeycomb block body 11 having the hollow auxiliary members and then detaching all of the hollow auxiliary members 4 from a dried honeycomb block body 11 having the hollow auxiliary members to obtain a honeycomb block body 21, and grinding an outer peripheral portion of a resultant honeycomb block body 21 in such a manner that at least a part of each of all of the triangular prism segments 3 is ground to obtain a honeycomb structure 100 having a predetermined shape. Here, the "triangular prism" includes the hollow shape having the triangular bottom face, and the "quadrangular prism" includes the columnar shape having the quadrangular bottom face in the present specification. Incidentally, the plugged portions are formed in the honeycomb fired body 2, as shown in FIG. 2.

Figure 3:
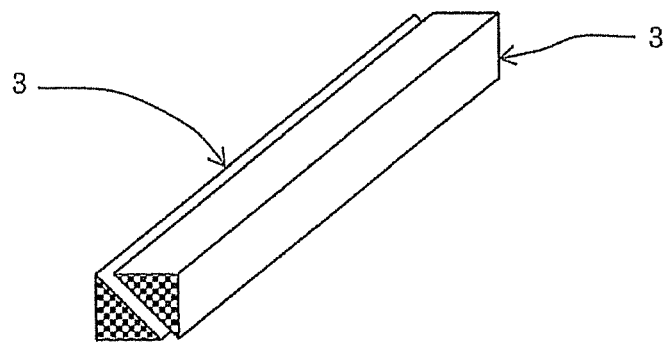
FIG. 3 is a perspective view schematically showing a state where a quadrangular prism honeycomb fired body is cut along a diagonal in across section perpendicular to the central axis so as to be parallel to the central axial direction to form two triangular prism segments in one embodiment of a method for manufacturing a honeycomb structure of the present invention.
Figure 4:
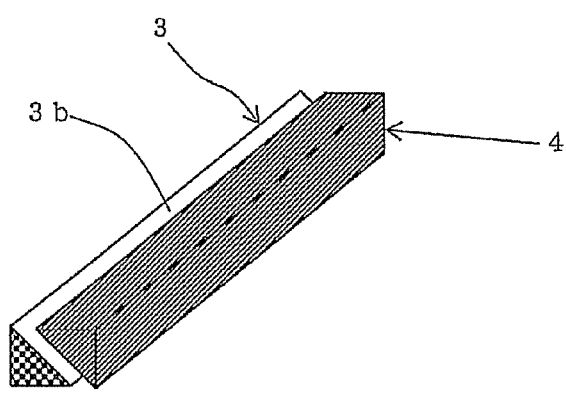
FIG. 4 is a perspective view schematically showing a state before the triangular prism segment is fitted on the triangular prism auxiliary member in one embodiment of a method for manufacturing a honeycomb structure of the present invention.
Figure 5:
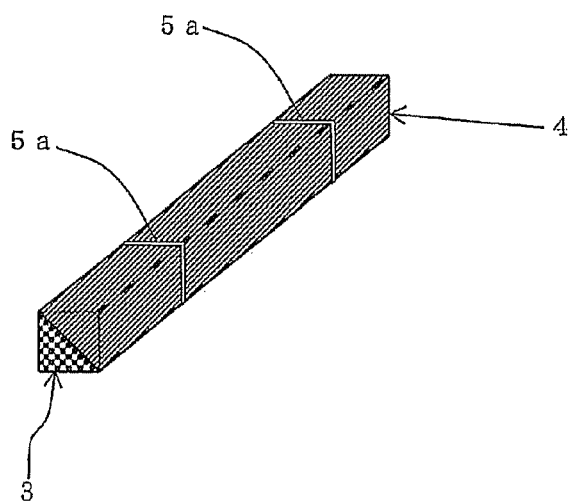
FIG. 5 is a perspective view schematically showing a state of forming a pseudo quadrangular segment by fitting the triangular segment on the triangular prism auxiliary member in one embodiment of a method for manufacturing a honeycomb structure of the present invention.
Figure 6:
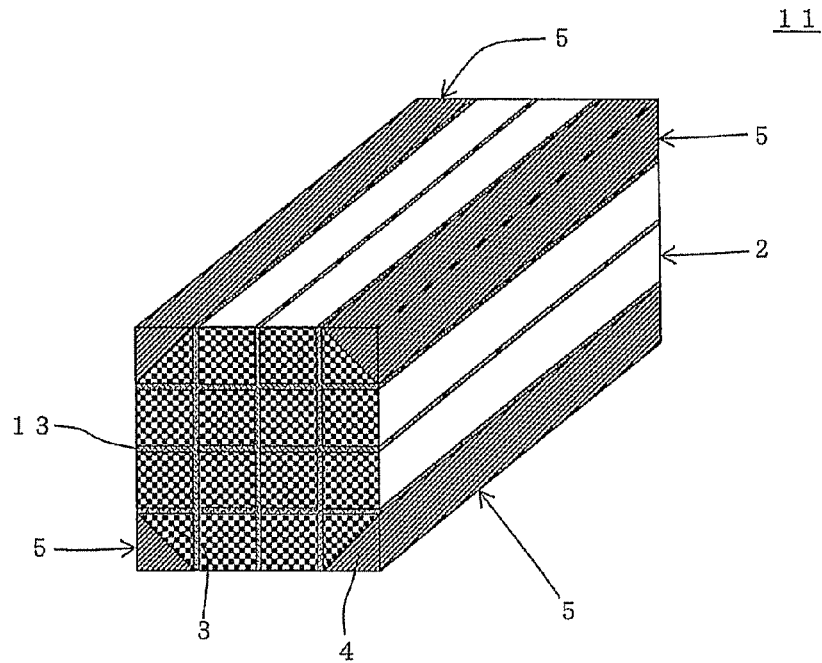
FIG. 6 is a perspective view schematically showing a honeycomb block body having been provided with the hollow auxiliary members formed in a process for manufacturing a honeycomb structure in one embodiment of a method for manufacturing a honeycomb structure of the present invention.
Figure 7:
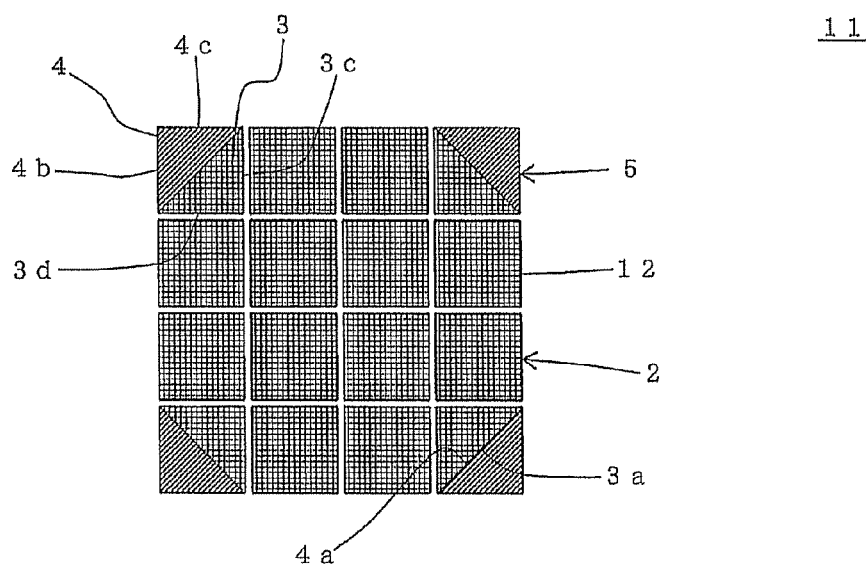
FIG. 7 is a schematic view showing a cross section perpendicular to the central axis of a honeycomb block body having been provided with the hollow auxiliary members formed in a process for manufacturing a honeycomb structure in one embodiment of a method for manufacturing a honeycomb structure of the present invention.
Figure 8:
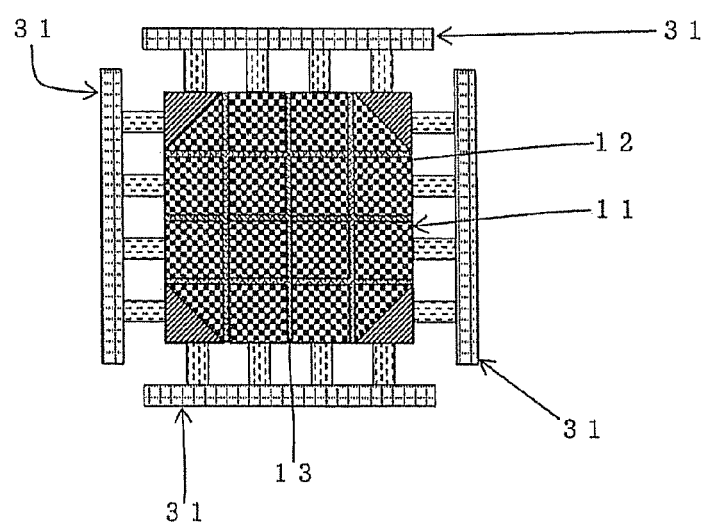
FIG. 8 is a plan view schematically showing a state where quadrangular prism honeycomb fired articles and quadrangular prism pseudo segments are bonded by applying a bonding material to side faces to each other and applying pressure with clenching from the outermost periphery toward the inside with a pressurizing jig in one embodiment of a method for manufacturing a honeycomb structure of the present invention.
Figure 9A:
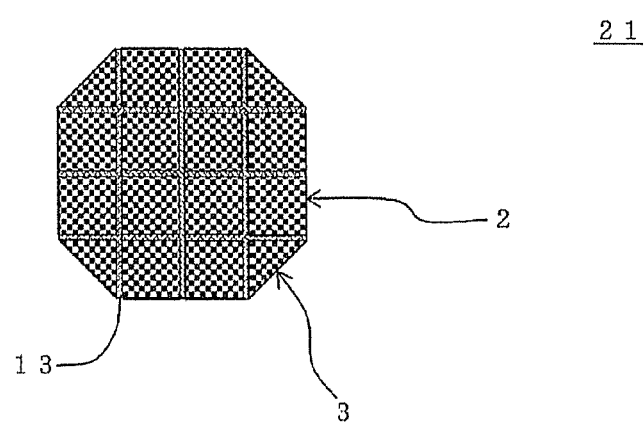
FIG. 9A is a plan view schematically showing a honeycomb block body formed in a process for manufacturing a honeycomb structure in one embodiment of a method for manufacturing a honeycomb structure of the present invention.
Figure 9B:
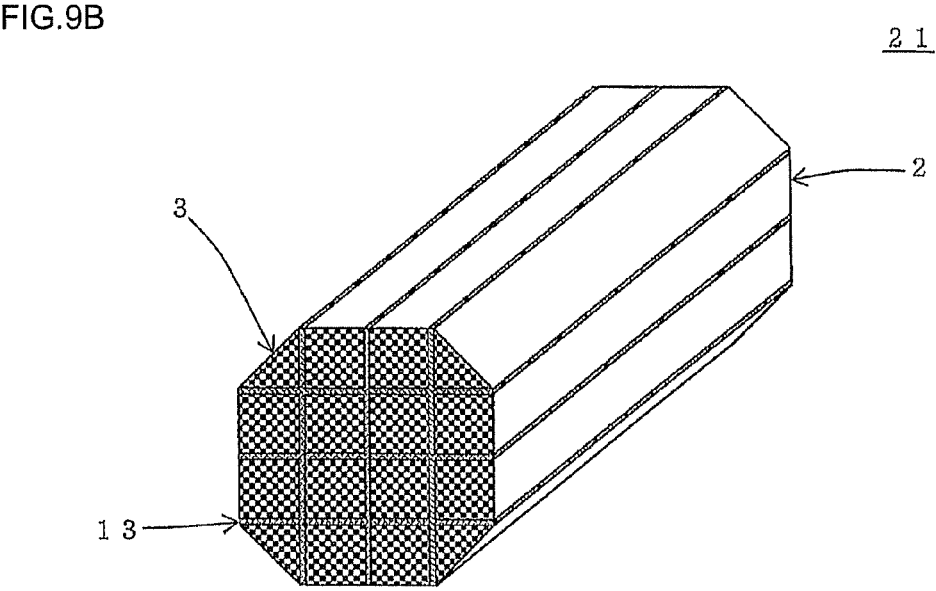
FIG. 9B is a perspective view schematically showing a honeycomb block body formed in a process for manufacturing a honeycomb structure in one embodiment of a method for manufacturing a honeycomb structure of the present invention.
Figure 10:
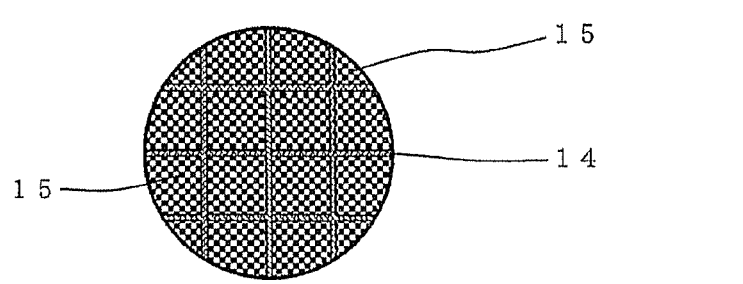
FIG. 10 is a plan view schematically showing a honeycomb structure manufactured in one embodiment of a method for manufacturing a honeycomb structure of the present invention.

Here, FIG. 1 is a perspective view schematically showing a quadrangular prism honeycomb formed body 1 formed in a process for manufacturing a honeycomb structure in one embodiment of a method for manufacturing a honeycomb structure of the present invention. FIG. 2 is a perspective view schematically showing a quadrangular prism honeycomb fired body 2 formed in a process for manufacturing a honeycomb structure in one embodiment of a method for manufacturing a honeycomb structure of the present invention. FIG. 3 is a perspective view schematically showing a state where a quadrangular prism honeycomb fired body 2 is cut along a diagonal in a cross section perpendicular to the central axis so as to be parallel to a central axis to form two triangular prism segments 3 in one embodiment of a method for manufacturing a honeycomb structure of the present invention. FIG. 4 is a perspective view schematically showing a state before the triangular prism segment 3 is fitted on the hollow auxiliary member 4 in one embodiment of a method for manufacturing a honeycomb structure of the present invention. FIG. 5 is a perspective view schematically showing a state of forming a quadrangular prism pseudo segment 5 by fitting the triangular prism segment 3 on the hollow auxiliary member 4 in one embodiment of a method for manufacturing a honeycomb structure of the present invention. FIG. 6 is a perspective view schematically showing a honeycomb block body 11 with auxiliary members formed in a process for manufacturing a honeycomb structure in one embodiment of a method for manufacturing a honeycomb structure of the present invention. FIG. 7 is a schematic view showing a cross section perpendicular to the central axis of a honeycomb block body 11 with auxiliary members formed in a process for manufacturing a honeycomb structure in one embodiment of a method for manufacturing a honeycomb structure of the present invention. FIG. 8 is a plan view schematically showing a state where quadrangular prism honeycomb fired bodies and quadrangular prism pseudo segments are bonded by applying a bonding material to side faces to each other and applying pressure with clenching from the outermost periphery toward inside with a pressurizing jig in one embodiment of a method for manufacturing a honeycomb structure of the present invention. FIG. 9A is a plan view schematically showing a honeycomb block body 21 formed in a process for manufacturing a honeycomb structure in one embodiment of a method for manufacturing a honeycomb structure of the present invention. FIG. 9B is a perspective view schematically showing a honeycomb block body 21 formed in a process for manufacturing a honeycomb structure in one embodiment of a method for manufacturing a honeycomb structure of the present invention. FIG. 10 is a plan view schematically showing a honeycomb structure 100 manufactured in one embodiment of a method for manufacturing a honeycomb structure of the present invention.

According to one embodiment of a method for manufacturing a honeycomb structure of the present invention, a honeycomb structure 100 is obtained by forming a quadrangular prism pseudo segment by fitting an aluminum or aluminum alloy hollow auxiliary member 4 whose outer peripheral shape has a cross section perpendicular to a central axis that is the same shape as an outer peripheral shape of a cross section perpendicular to the central axis of each of the triangular prism segments 3 so that a hypotenuse of the cross section perpendicular to the central axis of the hollow auxiliary member 4 faces a hypotenuse of the cross section perpendicular to the central axis of the triangular prism segment 3, disposing the quadrangular prism honeycomb fired bodies 2 and the quadrangular prism pseudo segments 5 to form an assembly of honeycomb segments in such a manner that two faces of each hollow auxiliary segment, which form a right angle there between in a cross section perpendicular to the central axis of the assembly, are located at an outermost peripheral position at respective corners of the assembly, and the two faces which constitute the respective remaining other two faces of the quadrangular prism pseudo segments 5 of all of the triangular prism segments 3 constituting the quadrangular prism pseudo segments 5 together with the hollow auxiliary members 4 are brought into contact with two faces each of the quadrangular prism honeycomb fired bodies 2 adjacent to each of the quadrangular prism pseudo segments 5 in a cross section perpendicular to the central axis, bonding the assembly by applying a bonding material 13 to spaces formed between the segments in the assembly, and then applying pressure to the bonded assembly by clenching the bonded assembly from the outermost periphery toward the inside to obtain a honeycomb block body 11 having the hollow auxiliary members at respective corners, drying the applied bonding material 13 applied to the spaces of the honeycomb block body 11 having the hollow auxiliary members and then detaching all of the hollow auxiliary members 4 from a dried honeycomb block body 11 having the hollow auxiliary members to obtain a honeycomb block body 21, and grinding an outer peripheral portion of a resultant honeycomb block body 21 in such a manner that at least a part of each of all of the triangular prism segments 3 is ground to obtain a honeycomb structure 100 having a predetermined shape. Therefore, the portion to be ground and removed upon grinding the outer peripheral portion is reduced, and therefore the raw material yield can be improved. Since triangular prism segments are disposed in a portion where quadrangular prism honeycomb fired bodies are disposed in a conventional method, the amount for grinding and removal is reduced. In addition, since two triangular prism segments are obtained from one quadrangular prism honeycomb fired body, the number of the quadrangular prism honeycomb fired bodies required for manufacturing a honeycomb structure can be reduced.

Further, since aluminum or aluminum alloy auxiliary members are used, the bonding material of the honeycomb block body having been provide with the auxiliary members can be dried at high temperature. In addition, since the auxiliary members are detached from a honeycomb block body having been provide with the auxiliary members in a state that the higher strength of the bonding material is exhibited by the high temperature drying, the auxiliary members can be detached without peeling the triangular prism segments from the honeycomb block body. Further, since the auxiliary members have a hollow shape and are made of aluminum or aluminum alloy, the auxiliary members are light and have high strength, and therefore the auxiliary members can easily be fitted on the triangular prism segments. In addition, since the auxiliary members have a hollow shape and are made of aluminum or aluminum alloy, the thermal capacity of the auxiliary members can be reduced, the thermal conductivity thereof can be made relatively high, and the rising rate of the temperature upon drying the bonded material of the honeycomb block body having been provided with the hollow auxiliary members can be increased. Hereinbelow, the method for manufacturing a honeycomb structure of the present embodiment will be described for each step.

(1) Producing of Honeycomb Formed Body:

Firstly, a binder, a surfactant, a pore former, water, and the like are added to a ceramic raw material to prepare a forming raw material. The ceramic raw material is preferably at least one selected from the group consisting of silicon carbide, silicon-silicon carbide based composite material, cordierite forming raw material, cordierite, mullite, alumina, titania, spinel, silicon carbide-cordierite based composite material, lithium aluminum silicate, aluminum titanate, and iron-chrome-aluminum based alloy. Of these, silicon carbide or silicon-silicon carbide based composite material is preferable. Incidentally, the cordierite forming raw material is a ceramic raw material having a chemical composition of 42 to 56 mass % of silica, 30 to 45 mass % of alumina, and 12 to 16 mass % of magnesia and forming cordierite by firing. In the case of silicon-silicon carbide based composite material, a mixture of a silicon carbide powder and a metal silicon powder is employed as the ceramic raw material. The content of a ceramic raw material is preferably 40 to 90 mass % with respect to the entire forming raw material.

Examples of the binder include methyl cellulose, hydroxypropoxyl cellulose, hydroxyehtyl cellulose, carboxymethyl cellulose, and polyvinyl alcohol. Of these, it is preferable to use methyl cellulose and hydroxypropoxyl cellulose together. The binder content is preferably 3 to 15 mass % with respect to the entire forming raw material.

The water content is preferably 7 to 45 mass % with respect to the entire forming raw material.

Examples of the surfactant include ethylene glycol, dextrin, fatty acid soap, and polyalcohol. These may be used alone or in combination of two or more kinds. The content of the surfactant is preferably 5 mass % or less with respect to the entire forming raw material.

There is no particular limitation of the pore former as long as it forms pores after firing, and examples of the pore former include starch, a resin balloon, a water-absorbing resin, a silica gel, and carbon. The content of the pore former is preferably 15 mass % or less with respect to the entire forming raw material.

Next, the forming raw material is formed to obtain a quadrangular prism honeycomb formed body 1 having a quadrangular cross section perpendicular to the central axis. The number of the honeycomb formed bodies can suitably be determined according to the shape and size of the honeycomb structure to be manufactured. In the method for manufacturing a honeycomb structure of the present embodiment, 14 honeycomb formed bodies are produced. Upon forming the forming raw material, the forming raw material is kneaded to prepare kneaded clay firstly. There is no particular limitation on the method for preparing kneaded clay by kneading the forming raw material, and, for example, a method using a kneader, a vacuum kneader, or the like may be employed. Then, the kneaded clay is subjected to extrusion forming to obtain a quadrangular prism honeycomb formed body 1, as shown in FIG. 1. The honeycomb formed body 1 has partition walls $1d$ defining a plurality of cells $1c$ functioning as fluid passages and extending from one end face $1a$ to another end face $1b$, and a quadrangular cross section perpendicular to the central axis (cross section perpendicular to the cell extension direction). The shape of the cross section perpendicular to the central axis of the honeycomb formed body 1 is preferably square. There is no particular limitation on the method for forming a honeycomb formed body by forming kneaded clay, and a conventionally known forming method such as extrusion forming can be employed. As a suitable method, a method where a honeycomb formed body is formed by extrusion forming with a die having a desired cell shape, partition wall thickness, and cell density can be employed. The material for the die is preferably refractory metal, which hardly abrades away.

Next, the honeycomb formed body obtained above is preferably dried. There is not particular limitation on the drying method, and examples of the drying method include an electromagnetic wave heating method such as microwave heating drying and high frequency dielectric heating drying and an external heating method such as hot air drying and superheated steam drying. Of these, in that the entire formed body can quickly and uniformly be dried without generating a crack, it is preferable to dry the honeycomb formed body by removing a certain amount of water by an electromagnetic wave heating method and then removing the remaining water by an external heating method. As the drying conditions, it is preferable that, after 30 to 95 mass % of water with respect to the water content before drying is removed by an electromagnetic wave heating method, the water content is reduced to 3 mass % or less by the external heating method. As the electromagnetic wave heating method, dielectric heating drying is preferable. As the external heating method, hot air drying is preferable. The drying temperature is preferably 90 to 180° C., and the drying time is preferably 1 to 10 hours.

Next, when the honeycomb structure does not have a desired length in the central axial direction (length in the cell extension direction), it is preferable to cut off both the end faces (both the end portions) to obtain a desired length. There is no particular limitation on the cutting method, and a method using a double-ended rim saw cutter or the like may be employed. In addition, it is preferable that a plurality of honeycomb formed bodies have the same shape and the same size.

Next, in the honeycomb formed body, it is preferable to form plugging portions in opening portions of predetermined cells in one end face and opening portions of the remaining cells in another end face. In the plugged honeycomb formed body, it is preferable that the predetermined cells having plugging portions formed on the one end face side and the remaining cells having plugging portions formed on another end face side are alternately disposed to show a checkerwise pattern on both the end faces. In the case that plugging portions are formed in the honeycomb formed body, the resultant honeycomb structure is a plugged honeycomb structure.

There is no particular limitation on the method for forming plugging portions in the honeycomb formed body, and the following method can be employed as an example. After a sheet is applied on an end face of the honeycomb formed body, holes are made in the positions of the sheet corresponding to the cells where plugging portions are to be formed. Then, the end face applied the sheet of the honeycomb formed body is immersed in plugging slurry obtained by slurrying the constituent materials for the plugging portion, and the slurry is filled into the opening end portions of the cells where the plugging portions are to be formed through the holes made in the sheet. Regarding another end face of the honeycomb formed body, in the cells where the plugging portions are not formed in the one end face, plugging portions are formed (plugging slurry is filled) by the same method as the aforementioned method for plugging in the one end face. As the constituent materials for the plugging portions, the same materials as those for the honeycomb formed body are preferably used. The plugging portions may be formed in a honeycomb fired body after firing the honeycomb formed body. In the case of forming the plugging portions in a honeycomb fired body, it is preferable to perform a thermal treatment, firing, and the like as necessary after forming the plugging portions in order to solidify the plugging portions and make the plugging portions attach to the partition walls closely.

(2) Producing of Honeycomb Fired Body:

Next, each honeycomb formed body is fired to obtain a honeycomb fired body 2 shown in FIG. 2. In order to remove a binder and the like before firing, degreasing (calcination) is preferably performed. The calcination is preferably performed at a highest temperature of 400° C. to 500° C. with keeping the highest temperature for 0.5 to 20 hours under an air atmosphere. There is no particular limitation on the methods for calcining and firing, and firing can be performed by the use of an electric furnace, a gas furnace, or the like. In the ease of silicon carbide or silicon-silicon carbide based composite material, the firing is preferably performed at a highest temperature of 1300 to 1500° C. with keeping heating for 1 to 10 hours under an inert atmosphere such as nitrogen or argon.

The partition walls of the honeycomb fired body are preferably porous. The lower limit of the open porosity of the partition walls of the honeycomb fired body is preferably 30%, more preferably 35%. The upper limit of the open porosity of the partition walls of the fired body is preferably 80%, more preferably 65%. By limiting the open porosity in such a range, there has an advantage of suppressing pressure loss with maintaining the strength. When the open porosity is below 30%, the pressure loss may rise. When the open porosity is above 80%, thermal conductivity may fall with decrease of the strength. The open porosity is measured by the Archimedes method.

The lower limit of the average pore size of the partition walls of the honeycomb fired body is preferably 5 μm, more preferably 7 μm. In addition, the upper limit of the average pore size is preferably 50 μm, more preferably 35 μm. By limiting the average pore size in such a range, there has an advantage of being able to effectively trap particulate matter (PM). When the average pore size is below 5 μm, clogging is prone to be caused due to particulate matter (PM). When the average pore size is above 50 μm, particulate matter (PM) may pass through the filter without being trapped by the filter. The average pore size is measured by a mercury porosimeter. The measurement can be performed by using, for example, "Porosimeter Model 9810 (trade name)" produced by Shimadzu Corporation.

When the material for the partition walls of the honeycomb fired body is silicon carbide, the average particle diameter of the silicon carbide particles is preferably 5 to 100 μm. By selecting such an average particle diameter, there has an advantage that porosity and pore size can easily be controlled for the filter. When the average particle diameter is smaller than 5 μm, the pore size may become too small. When it is larger than 100 μm, the porosity may become small. When the pore size is too small, clogging is easily caused due to particulate matter (PM). When the porosity is too small, pressure loss may rise. The average particle size is the value measured according to JIS R 1629.

There is no particular limitation on the cell shape of the honeycomb fired body (cell shape in a cross section perpendicular to the central axis (cell extension direction) of the honeycomb fired body), and examples of the cell shape include a triangle, a quadrangle, a hexagonal, an octagonal, a circular, and a combination of them. In the case of forming plugging portions, a combination of octagonal and quadrangle is a suitable example. The partition wall thickness of the honeycomb fired body is preferably 50 to 2000 μm. When the partition wall thickness is thinner than 50 μm, strength of the resultant honeycomb structure may decrease. When it is thicker than 2000 μm, pressure loss may increase. There is no particular limitation on the cell density of the honeycomb fired body, and it is preferably 0.9 to 311 cells/cm², more preferably 7.8 to 62 cells/cm².

The size (vertical×horizontal×length (length in the central axial direction)) of the honeycomb fired body is preferably 30 mm×30 mm×80 mm to 50 mm×50 mm×400 mm.

In addition, the thermal expansion coefficient of the resultant honeycomb fired body is preferably $1\times10^{-6}/°$ C. or more, more preferably $2\times10^{-6}/°$ C. to $7\times10^{-6}/°$ C. According to a method for manufacturing a honeycomb structure of the present invention, even if a honeycomb structure has segments having high thermal expansion coefficient, it can have high thermal shock resistance.

(3) Producing of Triangular Prism Segment:

Next, producing triangular prism segments 3 as "cut quadrangular prism honeycomb fired bodies" having the same area as each other in the cross section perpendicular to the central axis, as shown in FIG. 3, by cutting in half at least one of the plurality of the quadrangular prism honeycomb fired bodies along a diagonal in a cross section perpendicular to a central axis so as to be parallel to the central axis. Here, "cutting the honeycomb fired bodies is along a diagonal in a cross section perpendicular to the central axis so as to be parallel to the central axis" means that the cutting face upon cutting a honeycomb fired body is parallel to the central axis (includes the central axis) and that cutting is performed along one diagonal of the two diagonals in a quadrangular cross section perpendicular to the central axis of the honeycomb fired body, as shown in FIG. 3. In addition, "producing triangular prism segments 3 as cut quadrangular prism honeycomb fired bodies" means to form two triangular prism segments from one quadrangular prism honeycomb fired body by cutting the quadrangular prism honeycomb fired body. In the method for manufacturing a honeycomb structure of the present embodiment, four triangular prism segments are produced by cutting two quadrangular prism honeycomb fired bodies. In addition, since "cutting half the quadrangle prism honeycomb fired bodies along a diagonal in a cross section perpendicular to a central axis so as to be parallel to the central axis," the two triangular prism segments obtained from one quadrangular prism honeycomb fired body have the same area of the cross sections perpendicular to the central axis. That is, the two triangular prism segments obtained by cutting one quadrangular prism honeycomb fired body have the same shape.

When two triangular prism segments are formed from one quadrangular prism honeycomb fired body by cutting a quadrangular prism honeycomb fired body, it is preferable to cut the honeycomb fired body by the use of a cutting machine having a circular or linear cutter with an abrasive grain of diamond or the like adhering thereto.

(4) Producing of Honeycomb Block Body (Honeycomb Block Body Producing Step):

(4-1) Produce of Pseudo Quadrangular Segment:

Next, as shown in FIGS. 4 and 5, an aluminum or aluminum alloy hollow auxiliary member 4 whose outer peripheral shape has a cross section perpendicular to the central axis that is the same shape as the outer peripheral shape of a cross section perpendicular to the central axis of each of the triangular prism segments is fitted on each of the triangular prism segments so that a hypotenuse of the cross section perpendicular to the central axis of the auxiliary member 4 faces that of the triangular prism segment to obtain a quadrangular prism pseudo segment 5, as shown in FIG. 5. The fitting faces (faces facing each other) upon fitting the triangular prism segment 3 on the auxiliary member 4 are the side face 3b corresponding with the hypotenuse 3a in a cross section perpendicular to the central axis of the triangular prism segment 3 (see FIG. 7) and the side face corresponding with the hypotenuse 4a in a cross section perpendicular to the central axis of the auxiliary member 4 (see FIG. 7). In addition, the "hypotenuse in a cross section perpendicular to the central axis" of each of the triangular prism segment 3 and the auxiliary member 4 means a hypotenuse in a right triangle. That is, the hypotenuses 3a and 4a each means a side other than the two sides forming a right angle among the three sides in a "cross section perpendicular to the central axis" of each of the triangular prism segment 3 and the auxiliary member 4. There is no particular limitation on the method for fitting the triangular prism segment 3 on the auxiliary member 4. However, it is preferable that the auxiliary member 4 is not detached from the triangular prism segment 3 during the producing process and that the auxiliary member 4 can easily be detached from the triangular prism segment 3 when they are separated from each other. For example, it is preferable to fit the auxiliary member 4 on the triangular prism segment 3 by the use of a resin adhesive material. Since the use of the resin adhesive material enables to fit the auxiliary member 4 on the triangular prism segment 3 with filling in the unevenness of the cut face (side face corresponding with the hypotenuse in a cross section perpendicular to the central axis of the triangular prism segment 3) of the triangular prism segment 3, the auxiliary member 4 can be fitted firmly on the triangular prism segment 3. In addition, since the resin adhesive material do not volatilize upon drying the honeycomb block body having been provided with the hollow auxiliary members, the required bonding strength can be maintained. A specific example of the resin adhesive member is synthetic rubber impregnated with oil.

Figure 20:
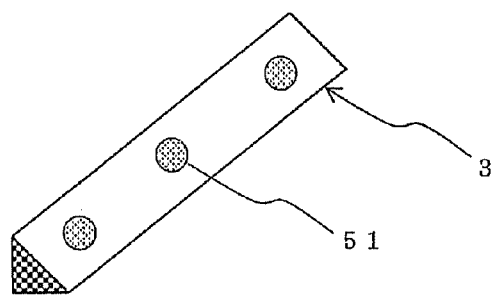
FIG. 20 is a perspective view schematically showing a state where a resin adhesive material is applied to three positions on a fitting face of the triangular prism segment produced in a process for manufacturing a honeycomb structure in one embodiment of a method for manufacturing a honeycomb structure of the present invention.

When the auxiliary member is fitted on the triangular prism segment, it is preferable to dispose the resin adhesive material in two or more positions, more preferably two to four positions, on the fitting faces of the triangular prism segment and the auxiliary member (see FIG. 20). In the case of disposing the resin adhesive material 51 in three or more positions, it is preferably disposed at regular intervals. In addition, the distance from the end portion in the cell extension direction of the triangular prism segment to the resin adhesive material closest to the end portion is preferably 15 to 50 mm. The area of one position of the resin adhesive material is preferably 0.5 to 2.0 $cm^2$, more preferably 0.8 to 1.5 $cm^2$. When it is smaller than 0.5 $cm^2$, the force for fitting the auxiliary member on the triangular prism segment may decrease. When it is larger than 2.0 $cm^2$, it may be difficult to detach the auxiliary member from the triangular prism segment. FIG. 20 is a perspective view showing a state where a resin adhesive material 51 is applied to three positions on the fitting face of the triangular prism segment 3 manufactured in a process for manufacturing a honeycomb structure in one embodiment of a method for manufacturing a honeycomb structure of the present invention.

in addition, for example, a method of tying them with a string 5a as shown in FIG. 5 may be employed. In the case of fitting them on with a string 5a, the aforementioned resin adhesive material may be applied on the faces to be fitted on. In the case of fitting them on with a string 5a, examples of the "string" to be used include a rubber string, a cotton string, a synthetic string, and a thread. It is preferable to dispose the string 5a in two to four positions in a state that the triangular prism segment 3 and the auxiliary member 4 are brought into contact with each other, as shown in FIG. 5. The positions of the string 5a are preferably positions where the triangular prism segment 3 and the auxiliary member 4 are evenly pressed as a whole by tying them with the string 5a. The diameter of the string 5a is preferably 0.5 to 1.5 mm.

In a method for manufacturing a honeycomb structure by bonding a plurality of honeycomb fired bodies to form the honeycomb structure, when a honeycomb block body is formed by combining the honeycomb fired bodies after the honeycomb fired bodies are produced, the honeycomb fired bodies are generally conveyed (moved) from the place where the honeycomb fired bodies are produced to the place where the honeycomb block body is formed. Such a conveyance of the honeycomb fired bodies is preferably automated by the use of a conveyer or the like. In addition, when the quadrangular prism honeycomb fired bodies are conveyed by a conveyer or the like, it is preferable to convey them in a state that the honeycomb fired bodies are putted on a "conveyance member" having a shape suitable for the quadrangular prism shape because falling or the like can be inhibited during the conveyance. In addition, since all the honeycomb fired bodies have the same quadrangular prism shape, the operation of combining the honeycomb fired bodies after the conveyance can be performed efficiently. In addition, in the case of automating the operation of combining the honeycomb fired bodies, when the honeycomb fired bodies have the same shape, it becomes easy to combine the honeycomb fired bodies by fastening them with a combining machine. In the method for manufacturing a honeycomb structure of the present embodiment, a part of the quadrangular prism honeycomb fired bodies are processed to obtain triangular prism segments having a different shape from the quadrangular prism honeycomb fired bodies. However, since auxiliary members are fitted on the triangular prism segments, respectively, to obtain pseudo quadrangular segments for use, the pseudo quadrangular segments can be handled in the same manner as in the quadrangular prism honeycomb fired bodies, and therefore the conveyance and combining can be performed efficiently.

The hollow auxiliary member (hollow shape having a triangular outer peripheral in bottom face) has the same shape as the outer peripheral shape of a cross section perpendicular to the central axis of the triangular prism segment, and is made of aluminum or aluminum alloy. Since the hollow auxiliary member is made of aluminum or aluminum alloy, the auxiliary member can be made lighter. So, the auxiliary member is easy to fit on the triangular prism segment, and, further, upon conveying the pseudo quadrangular segment, it can be prevented to detach the auxiliary member from the triangular segment. In addition, when the honeycomb block body having the auxiliary member is formed, it can be prevented to detach or slip the auxiliary members upon pressurization (when the honeycomb fired bodies and the pseudo quadrangular segments are bonded and pressurized from the outermost periphery toward the inside). In addition, when the honeycomb block body having the auxiliary member is dried, it can be prevented to detach or slip the auxiliary members. In addition, since the auxiliary member is made of aluminum or aluminum alloy, upon drying the honeycomb block body having the auxiliary members, it can be prevented to change the shape due to heat, and the auxiliary member is excellent in corrosion resistance. In addition, since aluminum and aluminum alloy are inexpensive, the auxiliary member can be produced at low costs. In addition, since the auxiliary member has small thermal capacity and relatively high thermal conductivity because of the hollow shape constituted of aluminum or aluminum alloy, the rising rate of temperature upon drying the bonding material of the honeycomb block body having the auxiliary members can be increased.

As a shape of the auxiliary member, both the end portions in the central axial direction may be open, or one end portion or both the end portions in the central axial direction may be closed by a plate-shaped bottom portion. The wall thickness of the hollow auxiliary member is preferably 1 to 5 mm. When the wall thickness of the auxiliary member is thinner than 1 mm, strength may be decreased. When the wall thickness of the auxiliary member is thicker than 5 mm, the weight may be increased.

Only one auxiliary member may be fitted on one triangular prism segment, or a plurality of short auxiliary members may be fitted on with intervals in the longitudinal direction (or with no interval). In the case of fitting only one auxiliary member on one triangular prism segment, the length of the auxiliary member in the central axial direction is preferably 90 to 100%, more preferably 100% of the length in the central axial direction of the triangular segment. In addition, in the case of fitting a plurality of auxiliary members on one triangular prism segment, the number of the auxiliary members to be fitted is preferably two or three, more preferably two. In the case of fitting two auxiliary members on one triangular prism segment, the length of each of the auxiliary members in the central axial direction is preferably 20 to 40% of the length in the central axial direction of the triangular prism segment. In addition, in the case of fitting a plurality of auxiliary members on one triangular prism segment, when a pseudo quadrangular segment is conveyed by the use of a conveyance member, it is preferable that the auxiliary members are disposed in a portion supported by the conveyance member. In addition, when a honeycomb block body having been provided with the hollow auxiliary members is produced, it is preferable that the auxiliary members are disposed in the positions where pressure is applied. One auxiliary member may be formed unitarily or formed by detachably connecting a plurality of triangular prism members (hollow shape having a triangular outer peripheral in bottom face).

The material for the auxiliary member is aluminum or aluminum alloy. As the aluminum alloy, Al—Mg—Si based aluminum alloy may be employed. Aluminum or aluminum alloy is preferable in that it is light and excellent in corrosion resistance as well as economic efficiency. The bulk density (g/cm$^3$) (mass of the auxiliary member/volume supposing that the auxiliary member is solid) of the auxiliary member is preferable 50 to 150%, more preferably 90 to 110%, particularly preferably 100% (the bulk density of the auxiliary member is the same as that of the triangular prism segment) with respect to the bulk density of the triangular prism segment. In the case that the bulk density of the auxiliary member is below 50% or above 150% with respect to that of the triangular prism segment, since the center of the gravity of the pseudo quadrangular segment is one sided, the auxiliary member and the triangular prism segment may have slippage upon conveyance (in particular, when they are rotated around the central axis) to deviate from the predetermined conveyance position, to drop, or may deviate from a stack position (stack position when a honeycomb block body having been provided with the hollow auxiliary members is formed) to form a non-uniform honeycomb block body.

(4-2) Production of Honeycomb Block Body Having been Provided with the Hollow Auxiliary Members:

Next, as shown in FIGS. 6 and 7, disposing the quadrangular prism honeycomb fired bodies 2 and the quadrangular prism pseudo segments 5 to form an assembly of honeycomb segments in such a manner that two faces 4b, 4c of each hollow auxiliary member, which forms a right angle there between in a cross section perpendicular to the central axis of the assembly, are located at an outermost peripheral position 12 at respective corners of the assembly, and the two faces 3c, 3d each which constitute the respective remaining other two faces of the quadrangular prism pseudo segments 5 of all of the triangular prism segments 3 constituting the quadrangular prism pseudo segments 5 together with the hollow auxiliary members 4 are brought into contact with the two faces each of quadrangular prism honeycomb fired bodies 2 adjacent to each of the quadrangular prism pseudo segments 5 in a cross section perpendicular to the central axis, bonding the assembly by applying a bonding material 13 to spaces formed between the segments in the assembly, and then, as shown in FIG. 8, applying pressure to the bonded assembly by clenching the bonded assembly from the outermost periphery toward the inside to obtain a honeycomb block body 11 having the hollow auxiliary members at respective corners. By forming a honeycomb block body having the hollow auxiliary members in this manner, when a honeycomb block body is formed by detaching the auxiliary members, there is obtained a honeycomb block body "to form an assembly of honeycomb segments in such a manner that two faces of each hollow auxiliary member, which form a right angle there between in a cross section perpendicular to the central axis of the assembly, are located at an outermost peripheral position at respective corners of the assembly, and the two faces each which constitute the respective remaining other two faces of the quadrangular prism pseudo segments of all of the triangular prism segments constituting the quadrangular prism pseudo segments together with the hollow auxiliary members are brought into contact with two faces each of quadrangular prism honeycomb fired bodies adjacent to each of the quadrangular prism pseudo segments in a cross section perpendicular to the central axis". The shape of a cross section perpendicular to the central axis of the honeycomb block body having the hollow auxiliary members is preferably quadrangular. In addition, in the case that a honeycomb structure to be manufactured is cylindrical shape, the shape of a cross section perpendicular to the central axis of the honeycomb block body having the hollow auxiliary members is preferably square. In the case that a honeycomb structure to be manufactured has a columnar shape having an elliptic bottom face or having a racetrack bottom shape, the shape of a cross section perpendicular to the central axis of the honeycomb block body having the hollow auxiliary members is preferably quadrangular with different vertical and horizontal lengths.

Here, the two faces which constitute the respective remaining other two faces of the pseudo quadrangular segments of all of the triangular prism segments 3″ mean the two faces perpendicular to each other as well as forming the vertex portion of the right angle among the three faces of the triangular prism segment 3. In addition, as shown in FIG. 7, "the two faces each which constitute the respective remaining other two faces of the quadrangular prism pseudo segments of all of the triangular prism segments 3 are brought into contact with the two faces each of quadrangular prism honeycomb fired bodies 2" means that each of two faces perpendicular to each other in each of the triangular prism segments 3 is brought into contact with (faces) one face of each of two quadrangular prism honeycomb fired bodies 2 in a cross section perpendicular to the central axis, and in such a manner that, when a honeycomb block body is formed by detaching the auxiliary members from the honeycomb block body having been provided with the hollow auxiliary members, the two faces perpendicular to each other of the triangular prism segment 3 are disposed inside the honeycomb block body without forming the outer periphery 12.

When the quadrangular prism honeycomb fired bodies and the quadrangular prism pseudo segments are bonded by applying a bonding material at the side faces, it is preferable to apply a masking tape in advance in portions where application of the bonding material is not intended, such as end faces of the honeycomb fired bodies and the quadrangular prism pseudo segments. In addition, it is preferable to bond the honeycomb fired bodies and the quadrangular prism pseudo segments covered by the masking tape by applying a bonding material, apply the pressure to the resultant, and then scrape and remove the slurried bonding material protruding on the end faces and the side faces. While the operation of bonding the honeycomb fired bodies and the quadrangular prism pseudo segments by applying a bonding material may be performed manually, it is preferably that it is performed mechanically. Here, "bonded by applying" of "the honeycomb fired bodies and the quadrangular prism pseudo segments are bonded by applying a bonding material" means a state of loose bonding by viscosity of the slurried bonding material, and they are not firmly bonded at this state.

An example of the bonding material is slurry obtained by adding an organic binder, a resin balloon, a dispersant, water, and the like to a filling material such as inorganic fibers, colloidal silica, kneaded clay, and SiC particles. A dried bonding material functions as a buffer portion 14 (see FIG. 10).

When the assembly of the quadrangular prism honeycomb fired bodies 2 and the quadrangular prism pseudo segments 5 bonded by applying a bonding material at the side faces is pressed by clenching them from the outermost periphery 12 toward the inside to obtain a honeycomb block body 11 having auxiliary members, it is preferable to apply pressure with a pressurizing jig 31 as shown in FIG. 8. At this time, it is preferable to press all the honeycomb fired bodies and quadrangular prism pseudo segments constituting the outer periphery with the pressurizing jig 31. In the method for manufacturing a honeycomb structure of the present embodiment, the honeycomb block body 11 having auxiliary members is constituted of "quadrangular prism segments (honeycomb fired bodies 2 and quadrangular prism pseudo segments 5)." Therefore, the whole shape of the honeycomb block body 11 having auxiliary members is also quadrangular prism. Therefore, when pressure is applied by clenching them from the outermost periphery 12 toward the inside, pressure can be applied evenly and strongly to the honeycomb block body 11 having auxiliary members, and therefore a strongly bonded honeycomb block body 11 having auxiliary members can be produced. This obtains a honeycomb structure 100 having a good bonding condition.

In the method for manufacturing a honeycomb structure of the present embodiment, since the shape of a cross section perpendicular to the central axis of the honeycomb block body 11 having auxiliary members can be made rectangular because the honeycomb fired bodies 2 and the quadrangular prism pseudo segments 5 have a quadrangular prism shape, the quadrangular prism honeycomb fired bodies 2 and the quadrangular prism pseudo segments 5 can be bonded by the use of a general pressurizing jig used in a method for manufacturing a honeycomb structure by bonding honeycomb segments. Therefore, since the honeycomb block body 11 having auxiliary members can be produced by the use of the manufacturing equipment used for a conventional method for manufacturing a honeycomb structure by bonding honeycomb segments, it is preferable in that new equipment is not required. As the pressurizing jig 31, it is preferable to use a steel block capable of transferring a pressure of 0.1 to 0.6 MPa to each of the honeycomb segments by a hydraulic pressure, pneumatic, or electric cylinder. In addition, it is preferable to use an elastic body of rubber or the like in the portion brought into contact with a quadrangular prism honeycomb fired body or a triangular prism segment.

(4-3) Drying of Honeycomb Block Body Having the Hollow Auxiliary Member:

Next, the bonding material 13 of the honeycomb block body 11 having hollow auxiliary members is dried. It is preferable to dry the honeycomb block body 11 having hollow auxiliary members at 80 to 170° C. for 0.5 to 2 hours for hardening the bonding material. Though the honeycomb block body having the hollow auxiliary members has hollow auxiliary members, deformation or the like due to heat upon drying is not caused since aluminum or aluminum alloy is employed as the material.

(4-4) Producing of Honeycomb Block Body:

Next, the hollow auxiliary members 4 are detached from the honeycomb block body 11 having the hollow auxiliary members to form a honeycomb block body 21, as shown in FIGS. 9A and 9B. In the case that the triangular prism segments and the hollow auxiliary members are bonded with a resin adhesive material, the hollow auxiliary members 4 can be detached easily. In addition, when the triangular prism segments and the hollow auxiliary members are bonded with a string, it is preferable to detach the hollow auxiliary members 4 from the honeycomb block body 11 having the hollow auxiliary members after cutting and removing the string. As shown in FIGS. 9A and 9D, in the method for manufacturing a honeycomb structure of the present embodiment, all the triangular prism segments 3 constitute the outermost periphery in a cross section perpendicular to the central axis of the honeycomb block body 21.

The honeycomb block body 21 shown in FIGS. 9A and 9B has a structure where the four honeycomb fired bodies located in the corner portions (vertex portions) in a cross section perpendicular to the central axis in the bonded body of 4×4 quadrangular prism honeycomb fired bodies are replaced by triangular prism segments. Such a structure (structure of a honeycomb block body) is referred to as a "4×4 structure". With producing four triangular prism segments, the honeycomb block body is produced so that the entire shape of the honeycomb block body has a shape where the honeycomb fired bodies and the triangular prism segments are bonded in such a manner that the triangular prism segments are disposed in the four vertex portions of a quadrangle in a cross section perpendicular to the central axis. In the method for manufacturing a honeycomb structure of the present embodiment, the structure of the honeycomb block body is not limited to the "4×4 structure" and is preferably "n×n structure (n is an integer of 3 or more)". Also, "m×l structure (m is an integer of 3 or more, and l is another integer of 3 or more and different from m)" is preferable. The n is more preferably 4 or more. The upper limit of the n is not particularly limited, 10 is preferable. In any of the structures, four corner portions are replaced by the triangular prism segments. More specific examples of the structure of the honeycomb block body include "3×3 structure", "5×5 structure", "6×6 structure", "7×7 structure", "8×8 structure", "3×4 structure", "4×5 structure", "5×6 structure", and "3×6 structure" incidentally, when a honeycomb block body of "n×n structure (n is an integer of 3 or more)" or "m×l structure (m is an integer of 3 or more, and l is another integer of 3 or more and different from m)" is manufactured, all of the triangular prism segments constituting the honeycomb block body form "quadrangular prism pseudo segments, where the hollow auxiliary members are fitted on" in the stage where a honeycomb block body having been provided with the hollow auxiliary members is formed.

Figure 11:
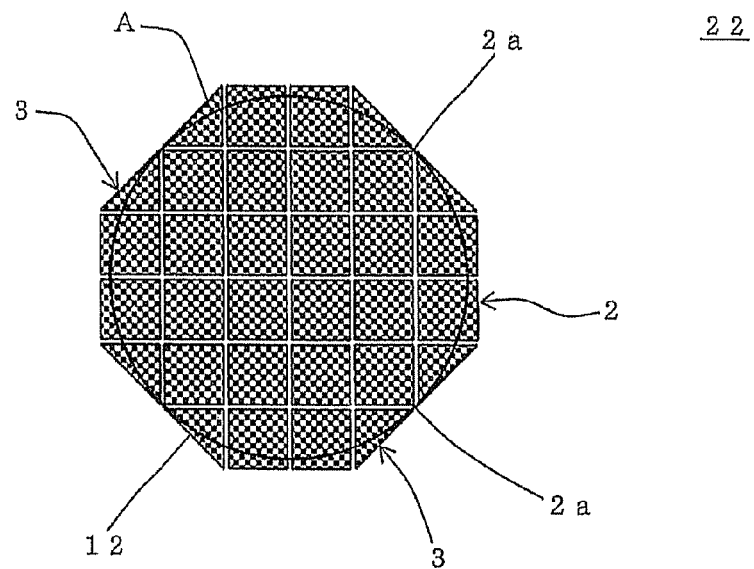
FIG. 11 is a plan view schematically showing a honeycomb block body formed in a process for manufacturing a honeycomb structure in the other embodiment of a method for manufacturing a honeycomb structure of the present invention.

In addition, in a method for manufacturing a honeycomb structure of the present invention, the shape of the honeycomb block body manufactured in the process for manufacturing a honeycomb structure is not limited to the shape where the four vertex portions of a quadrangle are replaced by the triangular prism segments in a cross section perpendicular to the central axis. A preferable example is, as shown in FIG. 11, a method where eight triangular prism segments 3 are produced, and a honeycomb block body 22 is produced so as to have an entire shape of a combination of the honeycomb fired bodies 2 and triangular prism segments 3 so that neither a honeycomb fired body nor a triangular prism segment is disposed in the four corner portions of the quadrangle and so that the eight triangular prism segments 3 are disposed in eight positions adjacent to the four corner portions, respectively, in a cross section perpendicular to the central axis. In FIG. 11, the circle A (grinding pattern) shown in the honeycomb block body 22 shows the outer periphery of a circular cylindrical honeycomb structure to be manufactured. FIG. 11 is a plan view schematically showing a honeycomb block body formed in a process for manufacturing a honeycomb structure in another embodiment of a method for manufacturing a honeycomb structure of the present invention.

In the honeycomb block body 22 shown in FIG. 11, supposing "that all the eight triangular prism segments are quadrangular prism honeycomb fired bodies and that quadrangular prism honeycomb fired bodies are disposed in the four vertex portions in a cross section perpendicular to the central axis", the cross section perpendicular to the central axis is a quadrangle formed by combining "6×6" honeycomb fired bodies. Such a honeycomb block body is referred to as a "6×6 structure (8)". "(8)" in the "6×6 structure (8)" means that the structure includes eight triangular prism segments. In the honeycomb block body 22, in the quadrangular prism honeycomb fired body brought into contact with both the two triangular prism segments 3, 3 adjacent to each other and disposed in such a manner that the hypotenuses of the two triangular prism segments 3 are arranged in a straight line in a cross section perpendicular to the central axis, the one vertex 2a constitutes the outermost periphery 12. In addition, the honeycomb fired body where (only) the one vertex 2a constitutes the outermost periphery 12 is a honeycomb fired body constituting the outermost periphery of the honeycomb block body 22.

The structure of the honeycomb block body where eight triangular prism segments are included and where four sets (2 triangular prism segments×4 positions) of "two adjacent triangular prism segments whose hypotenuses are arranged in a straight line" are formed is not limited to "6×6 structure (8)", and preferably "N×N structure (8) (N is an integer of 5 or more)" Also, "M×L structure (8) (M is an integer of 5 or more, and L is another integer of 6 or more and different from M)" is preferable. Both the structure is a structure of a combination of the honeycomb fired bodies 2 and the triangular prism segments 3 so that neither a honeycomb fired body nor a triangular prism segment is disposed in the four corner portions of the quadrangle and so that the eight triangular prism segments 3 are disposed in the eight positions adjacent to the four corner portions, respectively, in a cross section perpendicular to the central axis. More specific examples of the structure of the honeycomb block body include "5×5 structure (8)", "7×7 structure (8)", "8×8 structure (8)", "9×9 structure (8)", "5×6 structure (8)", "6×7 structure (8)", "7×8 structure (8)", "5×7 structure (8)", and "5×8 structure (8)" Incidentally, when a honeycomb block body having the aforementioned "N×N structure (8) (N is an integer of 5 or more) or "M×L structure (8) (M is an integer of 5 or more, and L is another integer of 6 or more and different from M)" is manufactured, all the triangular prism segments constituting the honeycomb block body form "quadrangular prism pseudo segments, where the auxiliary members are fitted on" in the stage where a honeycomb block body having been provided with the hollow auxiliary members is formed.

(5) Manufacturing of Honeycomb Structure:

Next, the outer peripheral portion of the honeycomb block body 21 as shown in FIGS. 9A and 9B is ground to obtain a honeycomb structure 100 as shown in FIG. 10. When the outer periphery of the honeycomb block body 21 is ground, apart of each of all the triangular prism segments 3 is ground. The expression "a part of each of all the triangular prism segments 3 is ground" means that apart of each of all of the triangular prism segments 3 constituting the honeycomb block body is ground; but it means that any triangular prism segment does not remain in an intact state without having been ground, on that any triangular prism segment does not disappear due to the complete grinding out. In addition, the outer peripheral portion of the honeycomb block body 21 means the segments constituting the outermost periphery of the honeycomb block body 21. In addition, the honeycomb structure 100 has a structure where a plurality of honeycomb segments 15 are bonded together.

Though there is no particular limitation on the method for grinding the outer peripheral portion of the honeycomb block body 21, a method where the honeycomb fired body is ground by the use of a cutting machine having a linear cutter where a diamond abrasive grain or the like is embedded, grinding machine, or the like is preferable.

The lower limit of the thickness of the buffer portion 14 (see FIG. 10) is preferably 0.3 mm, more preferably 0.7 mm. The upper limit is preferably 2.0 mm, more preferably 1.5 mm. When it is thinner than 0.3 mm, segments (each portion derived from a honeycomb fired body or a triangular prism segment is referred to as a "segment") may be brought into contact with each other when a force is applied to the honeycomb structure from outside. When it is thicker than 2.0 mm, pressure loss may be raised when the structure is used as a filter or the like for an exhaust gas treatment.

There is no particular limitation on the shape of the honeycomb structure to be manufactured, and the shape may be a circular cylindrical shape, a columnar shape having an elliptic cross section perpendicular to the axial direction, a columnar shape having a racetrack-shaped cross section perpendicular to the axial direction, or other shapes. When the shape is circular cylindrical, as the size of the honeycomb structure, the lower limit of the diameter of the bottom face is preferably 80 mm, more preferably 140 mm. The upper limit is preferably 400 mm, more preferably 300 mm. In addition, the lower limit of the length in the central axial direction of the honeycomb structure is preferably 80 mm, more preferably 150 mm. The upper limit is preferably 400 mm, more preferably 300 mm.

EXAMPLE

Hereinbelow, the present invention will be described more specifically by Examples. However, the present invention is by no means limited to these Examples.

Example 1

As ceramic raw materials, a SiC powder and a metal Si powder were mixed at a mass ratio of 80:20, and with the mixture were mixed methyl cellulose and hydroxypropoxymethyl cellulose as forming auxiliaries and starch and water-absorbing resin as pore former. Then, a surfactant and water were added to the mixture, and they were kneaded to obtain a circular columnar kneaded clay by a vacuum kneader.

The circular columnar kneaded clay was formed into a honeycomb shape by the use of an extruder, and, after the resultant was subjected to high frequency dielectric heating drying, it was dried at 120° C. for five hours by the use of a hot air drier. Then, a predetermined amount of both the end portions were cut off to obtain a quadrangular prism honeycomb formed body having a partition wall thickness of 310 μm, a cell density of 46.5 cells/cm$^2$, a square bottom face having a size of 36 mm×36 mm, and a length of 300 mm. Fourteen honeycomb formed bodies were produced.

In the honeycomb formed bodies obtained above, plugging portions were formed in an end portion of each cell so that adjacent cells are plugged in mutually opposite end portions and that both the end faces show a checkerwise pattern. For the filling material for plugging, the same material as that for the honeycomb formed bodies was used. The depth (depth in the cell extension direction) of the plugging portions was 6 mm. After the plugging, the plugged honeycomb formed bodies were dried at 120° C. for five hours by the use of a hot air drier.

Then, the honeycomb formed bodies were put in an ambient furnace with a deodorization equipment in the presence of the air, and temperature was raised up to 450° C. for about 20 hours (in particular, temperature was slowly raised in the range from 200 to 300° C., where organic components are decomposed). Then, the temperature of 450° C. was kept for five hours, and then the bodies were naturally cooled down to 100° C. for five hours in the furnace for degreasing (30 hour degreasing). Next, firing (main firing) was performed at about 1450° C. for 24 hours under an Ar inert atmosphere (temperature was raised for 10 hours, kept for 4 hours, and dropped for 10 hours) to obtain quadrangular prism honeycomb fired bodies each having a square bottom face, where the SiC crystal grains were bonded with Si. The honeycomb fired bodies had porous partition walls. The honeycomb fired bodies had an average pore size of 13 μm and a porosity of 41%. The average pore size was measured by a mercury porosimeter, and the porosity was measured by the Archimedes method.

Next, two honeycomb fired bodies out of the 14 honeycomb fired bodies were cut along a diagonal of a cross section perpendicular to the central axis in parallel with the central axis to obtain four triangular prism segments having the same area of a cross section perpendicular to the central axis from the two honeycomb fired body. The cutting of the honeycomb fired bodies was performed by the use of a cutting machine having a circular blade with a diamond abrasive grain.

After the four triangular prism segments were produced, a "hollow triangular prism (hollow shape with a bottom face having a triangular external shape)" auxiliary member having the same external shape as the triangular prism segment was fitted on each of the triangular prism segments so that a hypotenuse of a cross section perpendicular to the central axis of the auxiliary member faces that of the triangular prism segment to obtain a quadrangular prism pseudo segment. The material of the auxiliary members was aluminum, and the auxiliary members were fitted on the triangular prism segments with a resin adhesive material. As the resin adhesive material, synthetic rubber impregnated with mineral oil. The bulk density (g/cm$^3$) of the auxiliary member (mass of the auxiliary member/volume supposing that the auxiliary member was solid) was about 0.45. In addition, the wall thickness of the auxiliary member was 2 mm.

Next, the quadrangular prism honeycomb fired bodies and quadrangular prism pseudo segments were combined by bonding side faces to each other with a bonding material together so that the two sides perpendicular to each other of each of the triangular prism segments constituting the quadrangular prism pseudo segment are brought into contact with quadrangular prism honeycomb fired bodies in a cross section perpendicular to the central axis and that the two sides perpendicular to each other of the auxiliary member constituting the quadrangular prism pseudo segment are disposed in an outermost periphery, and then pressure was applied by clenching them from the outermost periphery toward the inside by the use of a pressurizing jig 31 as shown in FIG. 8 to obtain a honeycomb block body having the hollow auxiliary members. The honeycomb block body having the hollow auxiliary members had a structure where, in a cross section perpendicular to the central axis, four quadrangular prism pseudo segments are disposed in the four corner portions, respectively, in the square of 4×4 quadrangular prism honeycomb fired bodies. As the bonding material, a SiC based mortar adhesive material was used. As the pressurizing jig 31, there was used a carbon steel block body having synthetic rubber members in the segment contact portions thereof.

Next, the bonding material of the honeycomb block body having the hollow auxiliary members was dried. The drying was performed at 140° C. for three hours.

Figure 12:
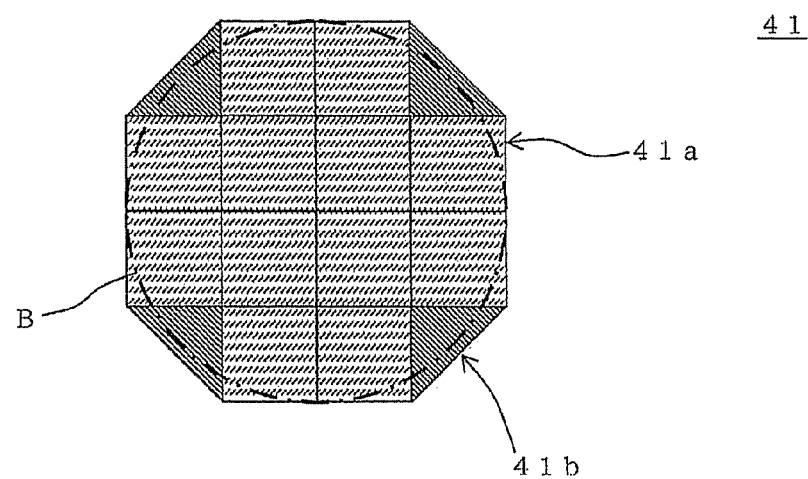
FIG. 12 is a schematic view showing a cross section perpendicular to the central axis, and showing a honeycomb block body produced in a process for manufacturing a honeycomb structure in the method for manufacturing a honeycomb structure of Example 1.

Next, the auxiliary members were detached from the dried honeycomb block body having the hollow auxiliary members to produce a honeycomb block body 41 having a "4×4 structure" as shown in FIG. 12. FIG. 12 is a schematic view showing a cross section perpendicular to the central axis, and showing a honeycomb block body 41 produced in a process for manufacturing a honeycomb structure in the method for manufacturing a honeycomb structure of Example 1.

Next, the outer peripheral portion of the honeycomb block body 41 was ground along the circular grinding pattern B shown in FIG. 12 to obtain a circular cylindrical honeycomb structure. The grinding pattern B is a circle inscribed in the shape of a cross section perpendicular to the central axis of the honeycomb block body. Here, the "circle inscribed in the shape of a cross section of the honeycomb block body" means the circle having the maximum diameter among circles inscribed in a part of the outer periphery of the honeycomb block body and not protruded out of the outer periphery.

The structure and grinding pattern of each honeycomb block body and the number of the honeycomb formed bodies are shown in Table 1.

TABLE 1

|  | Structure of block body | Grinding pattern | Number of formed bodies |
| --- | --- | --- | --- |
| Example 1 | 4 × 4 structure | Pattern B | 14 |
| Example 2 | 3 × 3 structure | Pattern B | 7 |
| Example 3 | 5 × 5 structure | Pattern B | 23 |
| Example 4 | 3 × 6 structure | Pattern C | 16 |
| Example 5 | 4 × 5 structure | Pattern C | 18 |
| Example 6 | 4 × 6 structure | Pattern C | 22 |
| Example 7 | 5 × 6 structure | Pattern C | 28 |
| Example 8 | 4 × 4 structure (2) | Pattern D | 15 |
| Example 9 | 3 × 3 structure (2) | Pattern D | 8 |
| Example 10 | 5 × 5 structure (2) | Pattern D | 24 |
| Example 11 | 6 × 6 structure (8) | Pattern E | 28 |
| Example 12 | 5 × 5 structure (8) | Pattern E | 17 |
| Example 13 | 7 × 7 structure (8) | Pattern E | 41 |
| Example 14 | 8 × 8 structure (8) | Pattern E | 56 |

TABLE 2

|  | Structure of block body | Grinding pattern | Number of formed bodies |
| --- | --- | --- | --- |
| Comp. Ex. 1 | 4 × 4 | Pattern B | 16 |
| Comp. Ex. 2 | 3 × 3 | Pattern B | 9 |
| Comp. Ex. 3 | 5 × 5 | Pattern B | 25 |
| Comp. Ex. 4 | 3 × 6 | Pattern C | 18 |
| Comp. Ex. 5 | 4 × 5 | Pattern C | 20 |
| Comp. Ex. 6 | 4 × 6 | Pattern C | 24 |
| Comp. Ex. 7 | 5 × 6 | Pattern C | 30 |
| Comp. Ex. 8 | 4 × 4 | Pattern D | 16 |
| Comp. Ex. 9 | 3 × 3 | Pattern D | 9 |
| Comp. Ex. 10 | 5 × 5 | Pattern D | 25 |
| Comp. Ex. 11 | 6 × 6 | Pattern E | 32 |
| Comp. Ex. 12 | 5 × 5 | Pattern E | 21 |
| Comp. Ex. 13 | 7 × 7 | Pattern E | 45 |
| Comp. Ex. 14 | 8 × 8 | Pattern E | 60 |

Examples 2 and 3

Each of the honeycomb structure was manufactured in the same manner as in Example 1 except that the structure of the block body and the number of the formed bodies were changed as shown in Table 1.

Example 4

Figure 13:
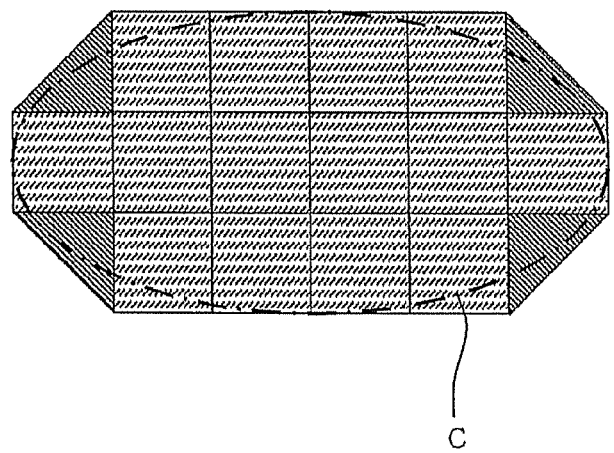
FIG. 13 is a schematic view showing a cross section perpendicular to the central axis, and showing a honeycomb block body produced in a process for manufacturing a honeycomb structure in the method for manufacturing a honeycomb structure of Example 4.

A honeycomb structure was manufactured in the same manner as in Example 1 except that the honeycomb block body 42 having a "3×6 structure" with a "grinding pattern C" as shown in FIG. 13 was produced and that the honeycomb structure was made to have a columnar shape having an elliptic bottom face. The grinding pattern C has an elliptic shape inscribed in the honeycomb block body in a cross section perpendicular to the central axis of the honeycomb block body with the major axis of the elliptic shape having the same length as the length in the longer axial direction (length in the direction where six quadrangular prism honeycomb fired bodies stand in a line of the honeycomb block body) and the minor axis of the elliptic shape having the same length as the length in the shorter axial direction (length in the direction where three quadrangular prism honeycomb fired bodies stand in a line of the honeycomb block body). The structure and grinding pattern of each honeycomb block body and the number of the honeycomb formed bodies are shown in Table 1. FIG. 13 is a schematic view showing a cross section perpendicular to the central axis, and showing a honeycomb block body 42 manufactured in a process for manufacturing a honeycomb structure in the method for manufacturing a honeycomb structure of Example 4.

Examples 5 to 7

Each honeycomb structure was manufactured in the same manner as in Example 4 except that the structure of the block body and the number of the formed bodies were changed as shown in Table 1.

Example 8

Figure 14:
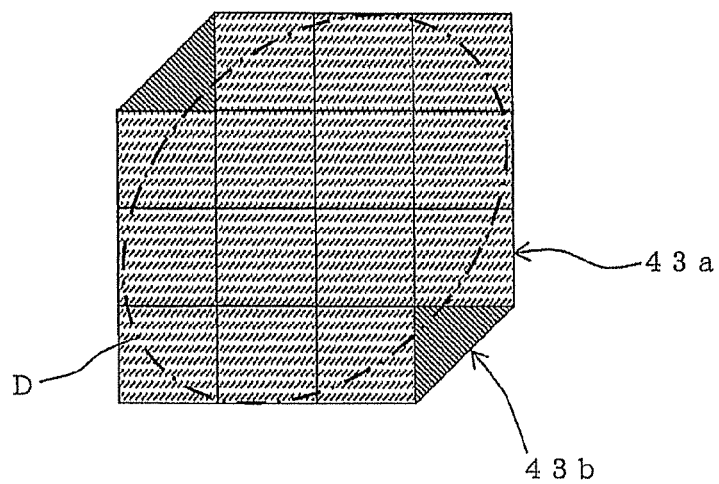
FIG. 14 is a schematic view showing a cross section perpendicular to the central axis, and showing a honeycomb block body produced in a process for manufacturing a honeycomb structure in the method for manufacturing a honeycomb structure of Example 8.

A honeycomb structure was manufactured in the same manner as in Example 1 except that the honeycomb block body 43 having a "4×4 structure (2)" with a "grinding pattern D" as shown in FIG. 14 was produced and that the honeycomb structure was made to have a columnar shape having an elliptic bottom face. "4×4 structure (2)" in a structure of the block body is a structure where the honeycomb fired bodies 43a constituting two corner portions (vertex portions) located on one diagonal in a cross section perpendicular to the central axis are replaced by the triangular prism segments 43b in a bonded body of 4×4 quadrangular prism honeycomb fired bodies 43a as shown in FIG. 14. In addition, the "grinding pattern D" is an elliptic shape which is inscribed in a honeycomb block body in a cross section perpendicular to the central axis of the honeycomb block body, has the major axis parallel to the other diagonal (diagonal combining the corner portions (vertexes) where quadrangular prism honeycomb fired bodies are disposed) of the honeycomb block body, and passes over the two triangular segments. Therefore, the resultant honeycomb structure had portions derived from two triangular prism segments. The structure and grinding pattern of each honeycomb block body and the number of the honeycomb formed bodies are shown in Table 1. FIG. 14 is a schematic view showing a cross section perpendicular to the central axis, and showing a honeycomb block body 43 manufactured in a process for manufacturing a honeycomb structure in the method for manufacturing a honeycomb structure of Example 8.

Examples 9 and 10

Each honeycomb structure was manufactured in the same manner as in Example 8 except that the structure of the block body and the number of the formed bodies were changed as shown in Table 1.

Example 11

Figure 15:
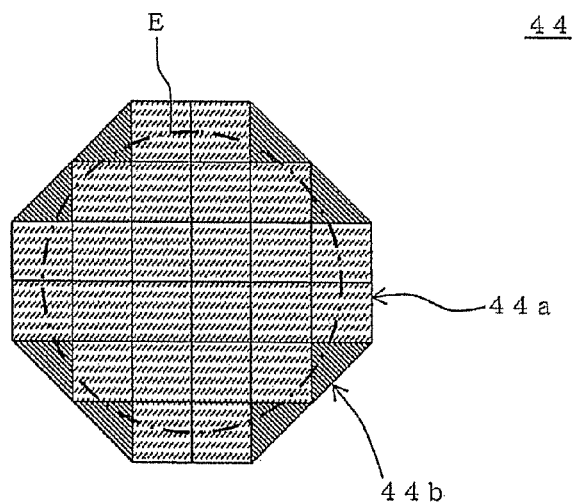
FIG. 15 is a schematic view showing a cross section perpendicular to the central axis, and showing a honeycomb block body produced in a process for manufacturing a honeycomb structure in the method for manufacturing a honeycomb structure of Example 11.

A honeycomb structure was manufactured in the same manner as in Example 1 except that the honeycomb block body 44 having a "6×6 structure (8)" with a "grinding pattern E" as shown in FIG. 15 was produced and that the honeycomb structure was made to have a columnar shape having a circular bottom face. The "grinding pattern E" is a circle having a predetermined diameter with the center point (center of gravity) of the honeycomb block body as the center in a cross section perpendicular to the central axis of the honeycomb block body. In Example 11, the diameter (predetermined diameter) of the circle in the grinding pattern E was 190 mm. The resultant honeycomb structure had portions derived from eight triangular prism segments. The structure and grinding pattern of each honeycomb block body and the number of the honeycomb formed bodies are shown in Table 1. FIG. 15 is a schematic view showing a cross section perpendicular to the central axis, and showing a honeycomb block body 44 manufactured in a process for manufacturing a honeycomb structure in the method for manufacturing a honeycomb structure of Example 11.

Examples 12 to 14

Each honeycomb structure was manufactured in the same manner as in Example 11 except that the structure of the block body and the number of the formed bodies were changed as shown in Table 1. Incidentally, in Example 12, the diameter of the circle of the grinding pattern F was 150 mm. In Example 13, the diameter of the circle of the grinding pattern E was 240 mm. In Example 14, the diameter of the circle of the grinding pattern E was 280 mm.

Comparative Example 1

Figure 16:
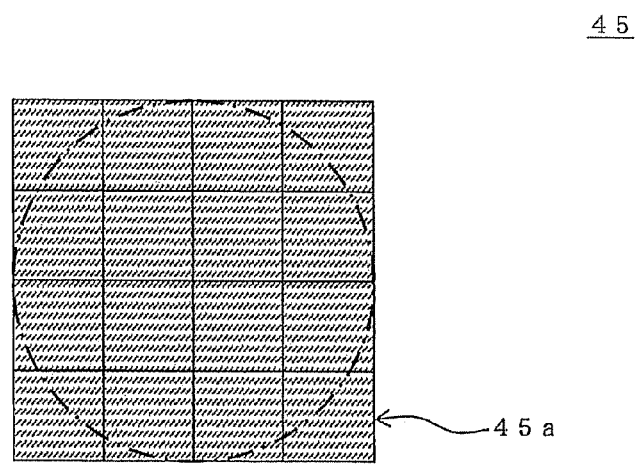
FIG. 16 is a schematic view showing a cross section perpendicular to the central axis, and showing a honeycomb block body produced in a process for manufacturing a honeycomb structure in the method for manufacturing a honeycomb structure of Comparative Example 1.

The honeycomb structure was manufactured in the same manner as in Example 1 except that a honeycomb block body was formed by disposing quadrangular prism honeycomb fired bodies 45a in the positions where the triangular prism segments were disposed in Example 1 as the honeycomb block body 45 shown in FIG. 16 with no triangular prism segment. FIG. 16 is a schematic view showing a cross section perpendicular to the central axis, and showing a honeycomb block body 45 manufactured in a process for manufacturing a honeycomb structure in the method for manufacturing a honeycomb structure of Comparative Example 1.

The structure and grinding pattern of each honeycomb block body and the number of the honeycomb formed bodies are shown in Table 2. Incidentally, a structure of a honeycomb block body with no triangular prism segment is simply shown by "X×Y" (X and Y are integers). For example, a blackbody having a structure of "4×4" means a block structure having 4×4 quadrangular prism honeycomb fired bodies and having a square cross section perpendicular to the central axis. In addition, since the honeycomb block body does not have any triangular prism segment, the entire "grinding pattern" is formed on quadrangular prism honeycomb fired bodies.

Comparative Examples 2 to 14

Figure 17:
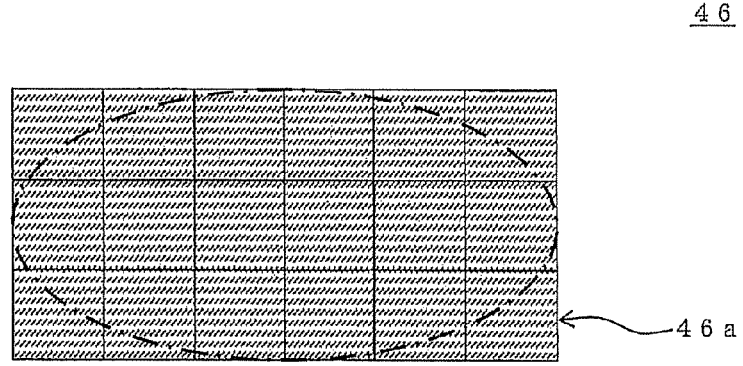
FIG. 17 is a schematic view showing a cross section perpendicular to the central axis, and showing a honeycomb block body produced in a process for manufacturing a honeycomb structure in the method for manufacturing a honeycomb structure of Comparative Example 4.
Figure 18:
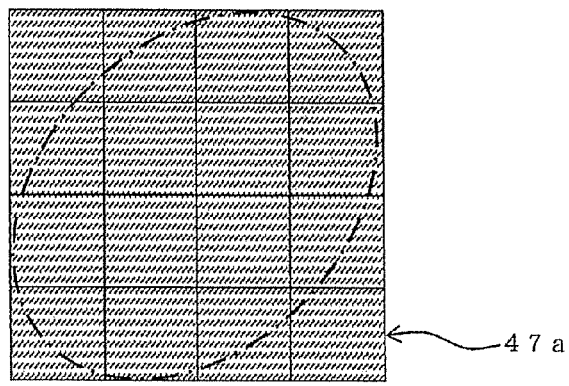
FIG. 18 is a schematic view showing a cross section perpendicular to the central axis, and showing a honeycomb block body produced in a process for manufacturing a honeycomb structure the method for manufacturing a honeycomb structure of Comparative Example 8.
Figure 19:
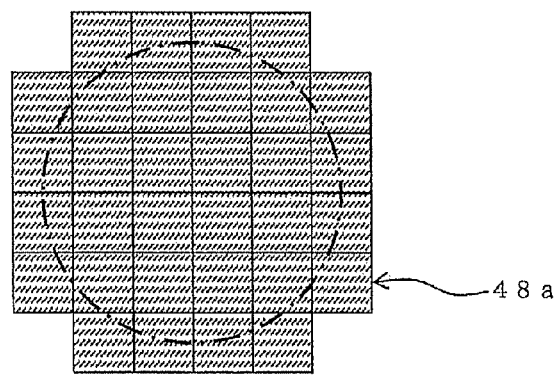
FIG. 19 is a schematic view showing a cross section perpendicular to the central axis, and showing a honeycomb block body produced in a process for manufacturing a honeycomb structure in the method for manufacturing a honeycomb structure of Comparative Example 11.

In Comparative Examples 2 to 14, each honeycomb structure was manufactured in the same manner as in Examples 2 to 14 except that the honeycomb block body was formed by disposing quadrangular prism honeycomb fired bodies in the positions where the triangular prism segments were disposed with manufacturing no triangular prism segment. For example, in Comparative Example 4, as shown in FIG. 17, a honeycomb block body 46 constituted of quadrangular prism honeycomb fired bodies 46a was formed. In addition, in Comparative Example 8, as shown in FIG. 18, a honeycomb block body 47 constituted of quadrangular prism honeycomb fired bodies 47a was formed. In addition, in Comparative Example 11, as shown in FIG. 19, a honeycomb block body 48 constituted of quadrangular prism honeycomb fired bodies 48a was formed. FIG. 17 is a schematic view showing a cross section perpendicular to the central axis, and showing a honeycomb block body 46 manufactured in a process for manufacturing a honeycomb structure in the method for manufacturing a honeycomb structure of Comparative Example 4. FIG. 18 is a schematic view showing a cross section perpendicular to the central axis, and showing a honeycomb block body 47 manufactured in a process for manufacturing a honeycomb structure the method for manufacturing a honeycomb structure of Comparative Example 8. FIG. 19 is a schematic view showing a cross section perpendicular to the central axis, and showing a honeycomb block body 48 manufactured in a process for manufacturing a honeycomb structure in the method for manufacturing a honeycomb structure of Comparative Example 11.

The structure and grinding pattern of each honeycomb block body, the number of the honeycomb formed bodies, presence/absence of the auxiliary member are shown in Table 2.

From Tables 1 and 2, it is understood that, since the methods for manufacturing a honeycomb structure of Examples 1 to 14 employed triangular segments for manufacturing each honeycomb structure, the number of the honeycomb formed bodies could be reduced to improve the raw material yield.

Comparative Example 15

The honeycomb structure was manufactured in the same manner as in Example 1 except that triangular prism members which are made of resin and are solid (having the same external shape as the triangular segment) were used as the auxiliary members. The bulk density of each of the auxiliary members was 1.6 g/cm$^3$. The material for the auxiliary members was nitrile rubber. There were observed the "slippage of the auxiliary member upon pressurization", "bonding slippage upon detachment of the auxiliary member", "thermal deformation of the auxiliary member", "slippage of the auxiliary member upon drying", and "rising rate of drying temperature". The results are shown in Table 3.

In Table 3, the "slippage of auxiliary member upon pressurization" means the evaluation for presence/absence of slippage of the auxiliary member from the triangular segment upon "combining the quadrangular prism honeycomb fired bodies and quadrangular prism pseudo segments by bonding side faces to each other with a bonding material together and then applying pressure with clenching them from the outermost periphery toward the inside to obtain a honeycomb block body having been provided with the hollow auxiliary members". "None" means that there was no "slippage", and "present" means that there was some "slippage". In addition, "bonding slippage upon detachment of the auxiliary member" means the evaluation for presence/absence of slippage in bonding between the quadrangular prism honeycomb fired body and the triangular prism segment upon "detaching the auxiliary member from the honeycomb block body with the auxiliary member to obtain a honeycomb block body". "None" means that there was no "slippage", and "present" means that there was some "slippage".

In addition, in Table 3, "thermal deformation of auxiliary member" means the evaluation for presence/absence of deformation of the auxiliary members due to heat when the honeycomb block body having been provided with the auxiliary member (the bonding material) is dried. "None" means that there was no deformation, and "present" means that there was some deformation. In addition, "slippage of auxiliary member upon drying" means the evaluation for presence/absence of slippage of the auxiliary members with respect to the triangular prism segment during drying the bonding material of the honeycomb block body having been provided with the auxiliary member. "None" means that there was no "slippage", and "present" means that there was some "slippage". In addition, "rising rate of drying temperature" means the evaluation for sufficient/insufficient drying of the bonding material in the drying of the bonding material of the honeycomb block body having been provided with the hallow auxiliary members. "OK" means that the temperature in the outer peripheral portion of the honeycomb block body reached 100° C. within 45 minutes, and "NG" means that the temperature in the outer peripheral portion of the honeycomb block body did not reach 100° C. within 45 minutes.

Incidentally, regarding Example 1, there were observed the "slippage of auxiliary member upon pressurization", "bonding slippage upon detachment of auxiliary member", "thermal deformation of auxiliary member", "slippage of auxiliary member upon drying", and "rising rate of drying temperature" in the process for manufacturing a honeycomb structure, and all the observations showed good results as shown in Table 3.

been provided with the hollow auxiliary members to subsequently dry the bonding material of not the honeycomb block body having been provided with the hollow auxiliary members but the honeycomb block body with no auxiliary member. There were observed the "slippage of auxiliary member upon pressurization", "bonding slippage upon detachment of auxiliary member", "thermal deformation of auxiliary member", "slippage of auxiliary member upon drying", and "rising rate of drying temperature" in the process for manufacturing the honeycomb structure. The results are shown in Table 3.

TABLE 3

| | Auxiliary member | | | Slippage of auxiliary member upon pressurization | Bonding slippage upon detachment of auxiliary member | Thermal deformation of auxiliary member | Slippage of auxiliary member upon drying | rising rate of drying temperature |
|---|---|---|---|---|---|---|---|---|
| | Material | Shape | Detachment timing | | | | | |
| Ex. 1 | Aluminum | Hollow | After drying | None | None | None | None | OK |
| Comp. Ex. 15 | Resin | Solid | After drying | None | None | Present | None | NG |
| Comp. Ex. 16 | Resin | Hollow | After drying | None | None | Present | None | OK |
| Comp. Ex. 17 | Aluminum | Solid | After drying | Present | None | None | Present | NG |
| Comp. Ex. 18 | Aluminum | Hollow | Before drying | None | Present | None | — | OK |

Comparative Example 16

The honeycomb structure was manufactured in the same manner as in Example 1 except that triangular prism members which are made of resin and are hollow (having the same external shape as the triangular segment) were used as the auxiliary members. The bulk density of each auxiliary member was 0.7 g/cm³. There were observed the "slippage of the auxiliary member upon pressurization", "bonding slippage upon detachment of the auxiliary member", "thermal deformation of the auxiliary member", "slippage of the auxiliary member upon drying", and "rising rate of drying temperature" in the process for manufacturing the honeycomb structure. The results are shown in Table 3.

Comparative Example 17

The honeycomb structure was manufactured in the same manner as in Example 1 except that triangular columnar members which are made of aluminum and are solid (having the same external shape as the triangular segment) were used as the auxiliary members. The bulk density of each auxiliary member was 2.6 g/cm³. There were observed the "slippage of auxiliary member upon pressurization", "bonding slippage upon detachment of auxiliary member", "thermal deformation of auxiliary member", "slippage of auxiliary member upon drying", and "rising rate of drying temperature" in the process for manufacturing the honeycomb structure. The results are shown in Table 3.

Comparative Example 18

The honeycomb structure was manufactured in the same manner as in Example 1 except that the auxiliary members were detached from the honeycomb block body having been provided with the hollow auxiliary members before drying the bonding material of the honeycomb block body having From Table 3, it is understood that, when the auxiliary members are made of resin (Comparative Examples 15 and 16), deformation is caused due to heat upon drying the bonding material of the honeycomb block body having been provided with the hollow auxiliary members. In addition, it is understood that, when the auxiliary members are solid and made of aluminum (Comparative Example 17), slippage is prone to be caused between the auxiliary member and the triangular prism segment because the bulk density of the auxiliary member is at least three times the bulk density of the triangular prism segment. In addition, it is understood that, in the case that the auxiliary members are detached before drying the bonding material of a honeycomb block body having been provided with the hollow auxiliary members (Comparative Example 18), slippage is caused in the fitting of triangular prism segments on the quadrangular prism honeycomb fired bodies because the bonding material is not dried.

Industrial Applicability

A method for manufacturing a honeycomb structure of the present invention can be used for manufacturing a honeycomb structure which can suitably be used as a carrier for a catalyst apparatus or a filter used for environmental countermeasure, collection of specific substrates, or the like in various fields of automobiles, chemistry, electric power, iron and steel, etc.

Reference Numerals

1: honeycomb formed body, 1a: one end face, 1b: another end face, 1c: cell, 1d: partition wall, 2: honeycomb fired body, 3: triangular prism segment, 3a: hypotenuse, 3b: side face, 3c, 3d: sides perpendicular to each other, 4: auxiliary member, 4a: hypotenuse, 4b, 4c: sides perpendicular to each other, 5: quadrangular prism pseudo segment, 5a: string, 11: honeycomb block body having been provided with auxiliary member, 12: outermost periphery, 13: bonding material, 14: buffer portion, 15: segment, 21, 22: honeycomb block body, 31: pressurizing jig, 41, 42, 43, 44, 45, 46, 47, 48: honeycomb block body, 41a, 43a, 44a, 45a, 46a, 47a, 48a: honeycomb fired body, 41b, 43b, 44b: triangular prism segment, 51: resin adhesive material, 100: honeycomb structure, A: circular shape, B, C, D, E: grinding pattern

What is claimed is:

1. A method for manufacturing a honeycomb structure, the method comprising the steps of:

forming a plurality of quadrangular prism honeycomb formed bodies each having partition walls defining a plurality of cells functioning as fluid passages and extending from one end face to another end face, and a rectangular cross section perpendicular to a central axis by subjecting a forming material to a forming, firing thus formed plurality of honeycomb formed bodies to obtain a plurality of quadrangular prism honeycomb fired bodies, producing triangular prism segments by cutting in half at least one of the plurality of the quadrangular prism honeycomb fired bodies along a diagonal in a cross section perpendicular to a central axis so as to be parallel to the central axis each other, forming a quadrangular prism pseudo segment by fitting an aluminum or aluminum alloy hollow auxiliary member whose outer peripheral shape has a cross section perpendicular to a central axis that is the same shape as an outer peripheral shape of a cross section perpendicular to the central axis of each of the triangular prism segments so that a hypotenuse of the cross section perpendicular to the central axis of the hollow auxiliary member faces a hypotenuse of the cross section perpendicular to the central axis of the triangular prism segment, forming a predetermined number of the quadrangular prism honeycomb fired bodies and a predetermined number of thus formed quadrangular prism pseudo segments into an assembly of honeycomb segments in such a manner that two faces of each hollow auxiliary member, which form a right angle therebetween in a cross section perpendicular to the central axis of the assembly, are located at an outermost peripheral position at respective corners of the assembly, and the two faces which constitute the respective remaining other two faces of the quadrangular prism pseudo segments of all of the triangular prism segments constituting the quadrangular prism pseudo segments together with the hollow auxiliary members are brought into contact with two faces of the quadrangular prism honeycomb fired bodies adjacent to each of said quadrangular prism pseudo quadrangular segments in a cross section perpendicular to the central axis, bonding the assembly by applying a bonding material to spaces formed between the segments in the assembly, and then applying pressure to the bonded assembly by clenching the bonded assembly from the outermost periphery toward the inside to obtain a honeycomb block body having the hollow auxiliary members at the respective corners, drying the bonding material applied to the spaces of the honeycomb block body having the hollow auxiliary members and then detaching all of the hollow auxiliary members from a dried honeycomb block body to obtain a honeycomb block body, and grinding an outer peripheral portion of a resultant honeycomb block body in such a manner that at least a part of each of all of the triangular prism segments is ground to obtain a honeycomb structure having a predetermined shape.

2. A method for manufacturing a honeycomb structure according to claim 1, wherein each hollow auxiliary member is fitted on each triangular prism segment with a resin adhesive material, individually.

3. A method for manufacturing a honeycomb structure according to claim 1, wherein four sets of triangular prism segments are produced by cutting, and the assembly is produced as a honeycomb block body having a whole shape by disposing one of the triangular prism segments at each of four vertex portions of a rectangle in a cross section perpendicular to the central axis.

4. A method for manufacturing a honeycomb structure according to claim 2, wherein four sets of triangular prism segments are produced by cutting, and the assembly is produced as a honeycomb block body having a whole shape by disposing one of the triangular prism segments at each of four vertex portions of a rectangle in a cross section perpendicular to the central axis.

5. A method for manufacturing a honeycomb structure according to claim 1, wherein eight sets of triangular prism segments are produced by cutting, and the assembly is produced as a honeycomb block body having a whole shape by disposing one of the triangular prism segments at eight portions each of which is formed as a vacant corner which is defined by two adjacent quadrangular prism honeycomb fired bodies of the assembly, respectively, in a cross section perpendicular to the central axis.

6. A method for manufacturing a honeycomb structure according to claim 2, wherein eight triangular prism segments are produced by cutting, and the assembly is produced as a honeycomb block body having a whole shape by disposing each of the triangular prism segments at eight portions each of which is formed as a vacant corner which is defined by two adjacent quadrangular prism honeycomb fired bodies of the assembly, respectively, in a cross section perpendicular to the central axis.

* * * * *